United States Patent
Glime

(10) Patent No.: US 8,434,793 B2
(45) Date of Patent: May 7, 2013

(54) COATED SEALS

(75) Inventor: William H. Glime, Painesville, OH (US)

(73) Assignee: Swagelok Company, Solon, OH (US)

( * ) Notice: Subject to any disclaimer, the term of this patent is extended or adjusted under 35 U.S.C. 154(b) by 578 days.

(21) Appl. No.: 12/669,106

(22) PCT Filed: Jul. 21, 2008

(86) PCT No.: PCT/US2008/070593
§ 371 (c)(1),
(2), (4) Date: Feb. 5, 2010

(87) PCT Pub. No.: WO2009/012479
PCT Pub. Date: Jan. 22, 2009

(65) Prior Publication Data
US 2010/0140527 A1    Jun. 10, 2010

Related U.S. Application Data

(60) Provisional application No. 60/961,225, filed on Jul. 19, 2007.

(51) Int. Cl.
*F16L 21/04*    (2006.01)

(52) U.S. Cl.
USPC ........ 285/342; 285/382.7; 138/109; 428/333; 428/450; 251/368

(58) Field of Classification Search ............ 251/331, 251/332, 61–61.5, 359, 368; 137/375; 92/103 R, 92/103 SD; 428/333, 450; 138/109; 285/342, 285/382.7
See application file for complete search history.

(56) References Cited

U.S. PATENT DOCUMENTS

| | | | |
|---|---|---|---|
| 2,179,127 A | 11/1939 | Lauer | |
| 2,644,664 A | 7/1953 | Hansen | |
| 3,107,373 A | 10/1963 | Mellon, Jr. et al. | |
| 3,198,481 A | 8/1965 | Bryant | |
| 3,349,795 A | 10/1967 | Matsutani | |
| 3,511,260 A | 5/1970 | Benjamin | |
| 3,521,910 A | 7/1970 | Callahan, Jr. et al. | |
| 3,888,521 A * | 6/1975 | O'Sickey | 285/341 |
| 3,982,559 A | 9/1976 | Ochs | |
| 4,596,268 A | 6/1986 | Jonas | |
| 4,634,093 A | 1/1987 | Schintgen | |
| 4,687,017 A | 8/1987 | Danko et al. | |
| 4,915,427 A * | 4/1990 | Zahuranec | 285/342 |

(Continued)

FOREIGN PATENT DOCUMENTS

| | | |
|---|---|---|
| GB | 321892 | 11/1929 |
| JP | 2002-323147 | 11/2002 |

(Continued)

OTHER PUBLICATIONS

Document A—Wikipedia, the free encyclopedia, May 7, 2007.*

(Continued)

*Primary Examiner* — John K Fristoe, Jr.
*Assistant Examiner* — Minh Le
(74) *Attorney, Agent, or Firm* — Calfee, Halter & Griswold LLP

(57) ABSTRACT

The seal made between two surfaces is enhanced by forming a coating (22), such as a self-assembled monolayer of a functionalized fluorinated macromolecule, on one or both of the surfaces.

15 Claims, 13 Drawing Sheets

U.S. PATENT DOCUMENTS

| | | | |
|---|---|---|---|
| 5,186,434 | A | 2/1993 | Nishimura et al. |
| 5,368,064 | A | 11/1994 | Kjaer |
| 5,413,311 | A | 5/1995 | Arstein et al. |
| 5,523,878 | A | 6/1996 | Wallace et al. |
| 5,609,907 | A | 3/1997 | Natan |
| 5,852,127 | A | 12/1998 | Belfort et al. |
| 5,924,441 | A | 7/1999 | Leys et al. |
| 6,096,149 | A | 8/2000 | Hetrick et al. |
| 6,146,767 | A * | 11/2000 | Schwartz ............... 428/457 |
| 6,345,845 | B2 * | 2/2002 | Johnston ............... 285/382.7 |
| 6,383,651 | B1 | 5/2002 | Weinert et al. |
| 6,403,760 | B1 | 6/2002 | Weinert et al. |
| 6,495,636 | B2 | 12/2002 | Sugiyama et al. |
| 6,518,168 | B1 | 2/2003 | Clem et al. |
| 6,629,682 | B2 | 10/2003 | Duelli |
| 6,660,828 | B2 | 12/2003 | Thomas et al. |
| 6,845,788 | B2 | 1/2005 | Extrand |
| 6,846,554 | B2 | 1/2005 | Fryxell et al. |
| 6,851,729 | B2 * | 2/2005 | Gibson ............... 285/341 |
| 6,893,716 | B2 * | 5/2005 | McGimpsey et al. ....... 428/333 |
| 6,902,947 | B2 | 6/2005 | Chinn et al. |
| 6,930,367 | B2 | 8/2005 | Lutz et al. |
| 7,309,902 | B2 | 12/2007 | Reboa |
| 7,361,724 | B2 * | 4/2008 | Guire et al. ............... 528/196 |
| 7,364,564 | B2 | 4/2008 | Sniegowski et al. |
| 7,370,664 | B2 | 5/2008 | Glime |
| 7,384,550 | B2 | 6/2008 | Rodgers et al. |
| 7,419,192 | B2 * | 9/2008 | Benoit et al. ............... 285/342 |
| 7,497,483 | B2 * | 3/2009 | Williams et al. .......... 285/382.7 |
| 7,806,443 | B1 * | 10/2010 | Plattner ............... 285/249 |
| 2002/0101079 | A1 * | 8/2002 | Ehrke ............... 285/354 |
| 2003/0060571 | A1 | 3/2003 | Weinert et al. |
| 2003/0109662 | A1 | 6/2003 | Medsker et al. |
| 2003/0129740 | A1 * | 7/2003 | Seo et al. ............... 435/287.2 |
| 2003/0138645 | A1 | 7/2003 | Gleason et al. |
| 2003/0149186 | A1 | 8/2003 | Medsker et al. |
| 2003/0153069 | A1 * | 8/2003 | Seo et al. ............... 435/287.2 |
| 2003/0166785 | A1 | 9/2003 | Medsker et al. |
| 2004/0000843 | A1 | 1/2004 | East |
| 2005/0145285 | A1 | 7/2005 | Extrand |
| 2005/0271809 | A1 | 12/2005 | Kobrin et al. |
| 2006/0012079 | A1 * | 1/2006 | Jung et al. ............... 264/338 |
| 2006/0036207 | A1 | 2/2006 | Koonmen et al. |
| 2006/0169941 | A1 * | 8/2006 | Glime ............... 251/331 |
| 2006/0173399 | A1 | 8/2006 | Rodgers et al. |
| 2006/0175573 | A1 | 8/2006 | Ohmi et al. |
| 2006/0206049 | A1 | 9/2006 | Rodgers et al. |
| 2006/0209117 | A1 * | 9/2006 | Parazak ............... 347/21 |
| 2006/0234901 | A1 | 10/2006 | Scheuing et al. |
| 2007/0020392 | A1 | 1/2007 | Kobrin et al. |
| 2007/0045587 | A1 * | 3/2007 | Kolenc et al. ............... 251/331 |
| 2007/0098894 | A1 | 5/2007 | Verghese et al. |
| 2007/0115531 | A1 | 5/2007 | Chen et al. |
| 2008/0123171 | A1 | 5/2008 | Dausch et al. |
| 2008/0164695 | A1 * | 7/2008 | Schiroky et al. ............... 285/342 |
| 2009/0020721 | A1 * | 1/2009 | Ohmi et al. ............... 251/331 |
| 2009/0160133 | A1 * | 6/2009 | Williams et al. ............... 277/314 |
| 2011/0240130 | A1 * | 10/2011 | Den Dulk et al. ............... 137/2 |

FOREIGN PATENT DOCUMENTS

| | | |
|---|---|---|
| WO | 95/23936 | 9/1995 |
| WO | 99/20705 | 4/1999 |
| WO | 2004/074722 | 9/2004 |
| WO | 2004/092622 | 10/2004 |
| WO | 2007/002576 | 1/2007 |
| WO | 2009/012479 | 1/2009 |

OTHER PUBLICATIONS

Office action from U.S. Appl. No. 11/343,105 dated Mar. 8, 2007.
Amendment from U.S. Appl. No. 11/343,105 dated Jun. 7, 2007.
Office action from U.S. Appl. No. 11/343,105 dated Oct. 2, 2007.
Amendment from U.S. Appl. No. 11/343,105 dated Dec. 26, 2007.
Notice of Allowance from U.S. Appl. No. 11/343,105 dated Jan. 11, 2008.
International Search Report and Written Opinion from PCT/US08/70593 dated Dec. 3, 2008.
International Search Report and Written Opinion from PCT/US06/003271 dated Jun. 2, 2006.
Biddle, Margaret M. "An Introduction to SAMs: Self-Assembled Monolayers in Organic Chemistry", 8 pgs., Oct. 9, 2001.
Pimanpang et al., "Self-assembled monolayer growth on chemically modified polymer surfaces", Applied Surface Science, 252, pp. 3532-3540 (2006).
Xie, et al., "Surface Micromachined Leakage Proof Parylene Check Valve", 14th IEEE International Conference Micro Electro Mechanical Systems (MEMS'01) Interlaken, Switzerland, 2001, pp. 539-542.
"Self-Assembled Monolayers", 6 pgs., printed May 7, 2007, http://www.ifm.liu.applphys/ftir/sams.html.
Six (6) pages from http://www.donwell.com/ printed Jun. 6, 2007.
Two (2) pages from http://memsurface.com/stiction.html, printed Jun. 6, 2007.
One (1) page from http://mem-exchange.org/catalog/P3513/, printed Jun. 6, 2007.
Seven (7) pages from http://en.wikipedia.org/wiki/MEMS, "Microelectromechanical systems", printed Jun. 6, 2007.
Two (2) pages from http://en.wikipedia.org/wiki/Self-assembled_monolayer, "Self-assembled monolayer", printed May 7, 2007.
Three (3) pages from http://en.wikipedia.org/wiki/Stiction, "Stiction", printed Jun. 6, 2007.

* cited by examiner

COATED SEALS

CROSS-REFERENCE TO RELATED APPLICATION

This application is the U.S. national phase entry of PCT/US2008/070593, with an international filing date of Jul. 21, 2008, entitled "COATED SEALS". This application claims priority to U.S. Provisional Patent Application No. 60/961,225 filed Jul. 19, 2007, the entire disclosure of which is incorporated herein by reference.

BACKGROUND AND SUMMARY

In commonly assigned U.S. Published Application 2006/0169941 (Ser. No. 11/343,105, filed Jan. 30, 2006), the disclosure of which is incorporated herein by reference, there is described a diaphragm-style valve in which the portion of the diaphragm which comes into sealing contact with the valve seat of the valve, or which is sealed to the valve body, is made softer than the remainder of the diaphragm or valve seat by coating with a polymer. Because of the relative softness of the polymer coating, a high integrity seal is more easily formed between these components because this coating deforms to accommodate minor voids, protrusions or other imperfections in the surfaces being sealed.

In accordance with this invention, a softer polymer coating is made from a self-assembled monolayer ("SAM"). The SAM soft polymer coating may be used in a wide variety of different applications where seals are made. These applications include, but are not limited to flow control devices, such as valves, and coupling devices, such as fittings. For example, in one embodiment the soft polymer coating of the diaphragm valve disclosed above is replaced with a SAM coating.

Thus, this invention in one embodiment provides a diaphragm style valve having a valve seat and a metal diaphragm structured to sealingly engage the valve seat at a sealing interface, wherein the portion of the diaphragm defining the sealing interface, or the portion of the valve seat defining the sealing interface, or both, carry a self-assembled monolayer.

In addition, this invention in another embodiment provides a flow control device comprising a body portion including a valve seat and a control member assembled with the body portion, the control member and/or the body portion being formed from a base material and a sealing surface, the sealing surface being configured for contacting and forming a sealing interface with the body portion, the valve seat or both, wherein the sealing surface is formed from a self-assembled monolayer.

Further, this invention in another embodiment provides a coupling device comprising a body portion and a seal member assembled with the body portion, the body portion and/or the seal member being formed from a base material and a sealing surface, the sealing surface is made from a self-assembled monolayer and more readily conforms to the mating surface to which it seals.

BRIEF DESCRIPTION OF THE DRAWINGS

The following drawings illustrate an exemplary embodiment of this invention.

DETAILED DESCRIPTION

The present invention contemplates a flow control device that includes a control member for forming a seal with another part or portion of the flow control device and a coupling device that includes a seal member that forms a seal with another part or portion of the coupling device. In order to enhance a seal, in an exemplary embodiment the control member or seal member includes a surface portion that is softer or more deformable than the base material from which the control member is made. This surface portion is made from a self-assembled monolayer and more readily conforms to the mating surface to which it seals, thus requiring less force to form a satisfactory seal.

In another embodiment, the valve seat of the flow control device can be provided with a self-assembled monolayer to make it softer or more deformable than the base material from which the valve seat is made. As in the previous embodiment, this self-assembled monolayer more readily conforms to the mating surface of the structure to which it seals, i.e., the control member, because of its softer character.

In still other embodiments, one or more components of the flow control device which permanently bond to one another can be provided with a self-assembled monolayer on their mating surfaces to make these surfaces softer or more deformable than the materials from which these components are made, again so that this softer material more readily conforms to mating surface to which it seals. An example of such a permanently bonded portion would be the periphery of a diaphragm which is permanently bonded between the valve body and the bonnet of a diaphragm-style valve. In this context, "permanently bonded" means a bond that is intended to remain intact over multiple openings and closings of the flow control device. Thus, the diaphragm of a diaphragm style valve which is held in place by being clamped between associated components of the valve is "permanently bonded" in the valve in the context of this document, even though this diaphragm can be readily replaced with a new diaphragm by unclamping the valve, replacing the diaphragm and then reclamping the valve.

Exemplary Applications

A self-assembled monolayer can be used in a wide variety of different applications where seals are made. These applications include, but are not limited to flow control devices, such as valves, and coupling devices, such as fittings.

A self-assembled monolayer can be used on one or more seal surface of a wide variety of different valves. Examples of valves that can be modified to include self-assembled monolayer seal surfaces include, but are not limited to, diaphragm valves, needle valves, bellows valves, ball valves, plug valves, weir valves, etc.

FIGS. 1-8 illustrate an exemplary valve structure on which this invention can be practiced. However, this invention is equally applicable to valves and other flow control devices of other structures.

Figure 1:
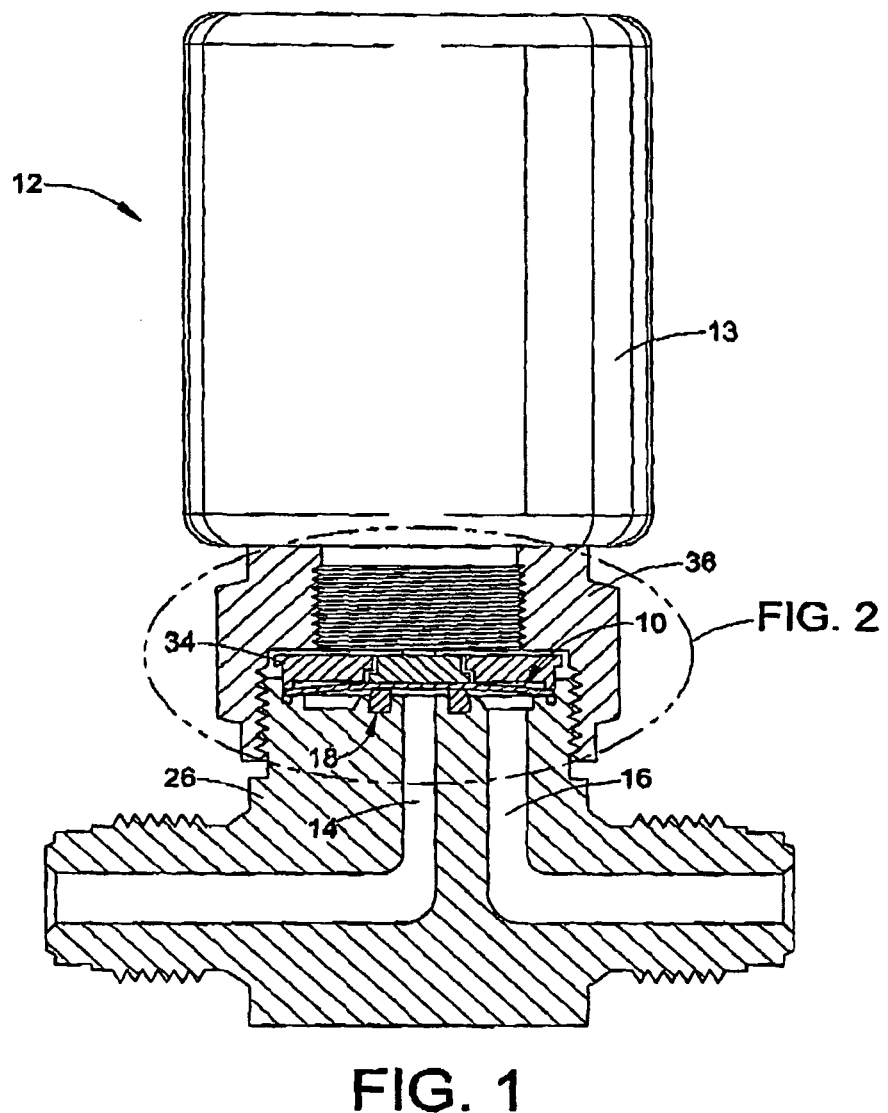
FIG. 1 is an illustration of a diaphragm valve assembled with a pneumatic actuator.

Referring to the exemplary embodiment of FIG. 1, a coated flexible member 10 is used in a valve arrangement 12 that includes a pneumatic actuator 13, an inlet port 14, an outlet port 16, and a valve seat 18. The coated flexible member 10 in the exemplary embodiment of FIG. 1 is realized in the form of a diaphragm for providing a sealing engagement with the valve seat 18. It should be readily apparent that the illustrated inlet port 14 could function as an outlet port and the illustrated outlet port 16 could function as an inlet port. Furthermore, it should be readily apparent, that the diaphragm 10 could be used in a variety of different types of valve arrangements, such as for example, but not limited to, manually actuated valve arrangements, electrically actuated valve arrangements, and normally open or normally closed valve arrangements.

In the exemplary embodiment of FIG. 1, the diaphragm 10 comprises a flexible metallic member 20 or substrate. A coating 22 is disposed on the flexible metallic member (see FIGS. 4A and 4B) to aid in sealing an interface between the diaphragm 10 and the valve seat 18 and/or an interface between the diaphragm and a valve body 26.

Figure 2A:
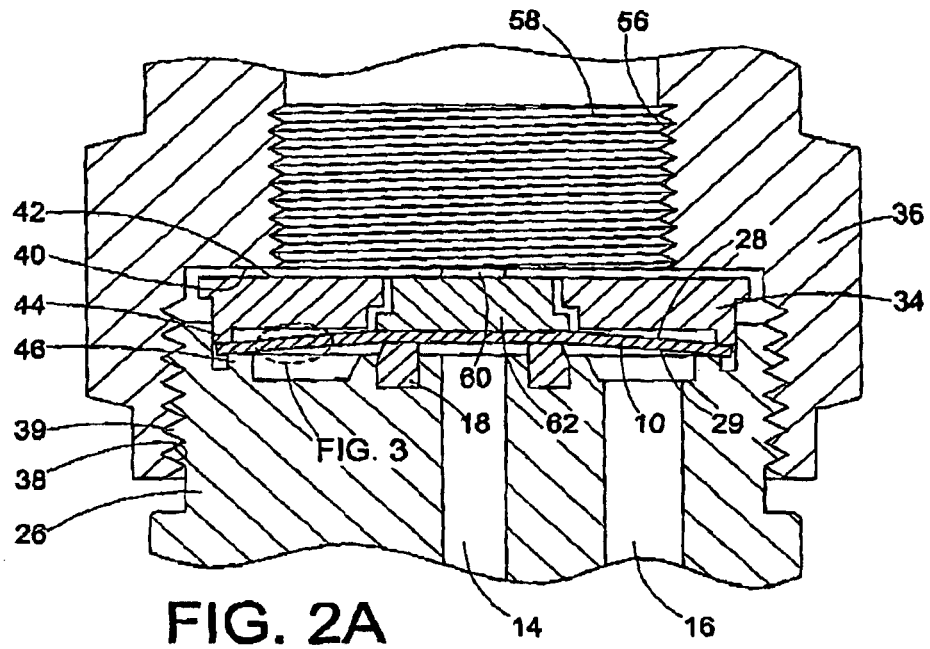
FIG. 2A is an enlarged view showing the portion of FIG. 1 that is identified by the reference FIG. 2.

In the embodiment illustrated by FIG. 2A, the valve seat 18 is a separate annular seat member that is assembled with the valve body 26. The separate annular seat member 18 may be a plastic member, a metallic member, an annular metallic member that includes a thin polymer coating, or other suitable material(s). The thin polymer coating may be formed from the same materials as the coating 22 on the diaphragm 10. In one embodiment of the diaphragm valve arrangement 12, the valve seat 18 includes the coating 22 and the diaphragm 10 does not include the coating in the area of contact with the valve seat.

Figure 2B:
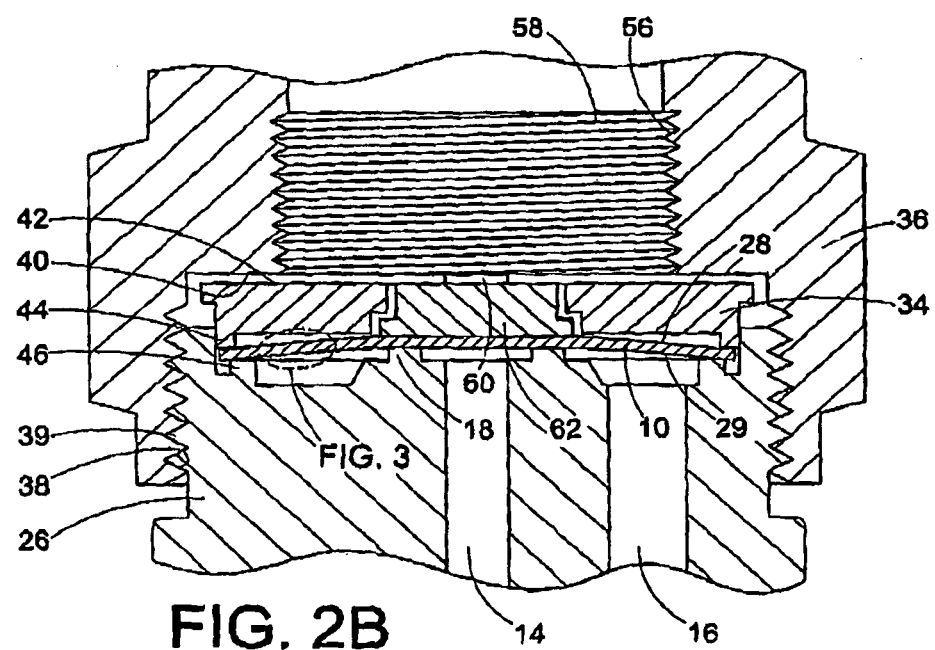
FIG. 2B is a view similar to the view of FIG. 2A showing the valve body that includes an integral valve seat.
Figure 3:
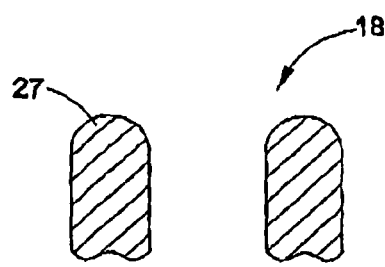
FIG. 3 is a cross-sectional view of a valve seat.

In the embodiment illustrated by FIG. 2B, the valve seat 18 is integrally formed with the valve body 26. For example, the valve body 26 may be a metallic member and the valve seat 18 may be a metallic portion of the valve body. The valve seat 18 may be configured in a variety of ways. For example, FIG. 3 illustrates one possible valve seat configuration. In the example of FIG. 3, the integral valve seat 18 has a rounded annular bead cross-section 27.

Referring to the exemplary embodiment of FIGS. 1, 2A, and 2B, the diaphragm 10 is assembled with the valve body 26 to flex into sealing engagement with the valve seat 18 and out of engagement with the valve seat. When assembled, the diaphragm 10 has an actuator side 28 and a valve seat side 29. The valve body 26 and the diaphragm 10 define a flow path from the inlet port 14 to the outlet port 16 when the diaphragm is not flexed, thus allowing process fluid to flow from the inlet port 14 to the outlet port 16. The pneumatic actuator 13 is assembled with the valve body 26 and diaphragm 10 for selectively flexing the diaphragm into and out of engagement with the valve seat 18. When the diaphragm 10 is flexed into engagement with the valve seat 18, the coating 22 contacts and seals with the valve seat.

In the illustrated example, a bonnet 34 secures the diaphragm 10 to the valve body 26 and a bonnet nut 36 clamps the bonnet 34 and diaphragm 10 to the valve body 26. By including the coating 22 on the diaphragm 10 in the area where the valve body 26 engages the periphery of the diaphragm 10, the amount of force required to properly seal the diaphragm 10 to the valve body 26 is reduced. In addition, the range of acceptable forces that will properly seal the diaphragm 10 with the valve body 26 is broadened. The illustrated bonnet nut 36 includes internal threads 38 that engage outer threads 39 of the valve body 26. A clamping surface 40 of the bonnet nut 36 engages an end surface 42 of the bonnet 34 to force the bonnet toward the valve body 26. In the illustrated embodiment, an annular ridge 44 on the bonnet 34 and an annular ridge 46 on the valve body 26 clamp the outer periphery of the diaphragm 10 to form a seal between the outer periphery of the diaphragm 10 and the valve body 26. The coating 22 on the periphery of the diaphragm 10 acts as a seal between the diaphragm flexible metallic member 20 or substrate and the valve body 26. If desired, the polymer coating of this invention can be applied to annular ridge 44 on the bonnet 34 and annular ridge 46 on the valve body 26 in addition to, or in lieu of, coating 22 on diaphragm 10.

In the example illustrated by FIGS. 1, 2A, and 2B, the actuator 13 is assembled to the valve assembly 12 by the bonnet nut 36. The illustrated bonnet nut 36 includes internal threads 56 that engage external threads 58 of the actuator 13. The actuator 13 selectively extends an actuator rod 60 to move a button 62 along a path of travel defined by the bonnet 34. When the rod 60 is extended, the button 62 deflects the diaphragm 10 into sealing engagement with the valve seat 18. When the rod 60 is retracted, the diaphragm 10 flexes away from the valve seat 18 to open the flow path between the inlet port 14 and outlet port 16.

Figure 4A:
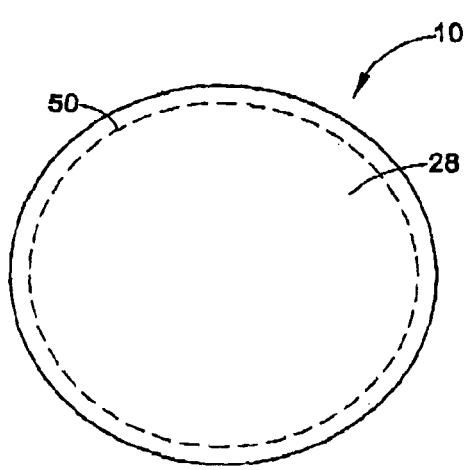
FIG. 4A is a schematic illustration of a diaphragm showing contact areas on an actuator side of the diaphragm.

FIG. 4A schematically illustrates where the bonnet annular ridge 44 engages the diaphragm 10 when the valve arrangement 12 is assembled. Phantom line 50 illustrates the contact location of the bonnet annular ridge 44 on the actuator side 28 of the diaphragm 10. The bonnet annular ridge 44 may contact the diaphragm 10 along the phantom line 50 or may contact an area of the diaphragm 10, such as for example, the area on the diaphragm 10 between the phantom line 50 and the outer edge of the diaphragm.

Figure 4B:
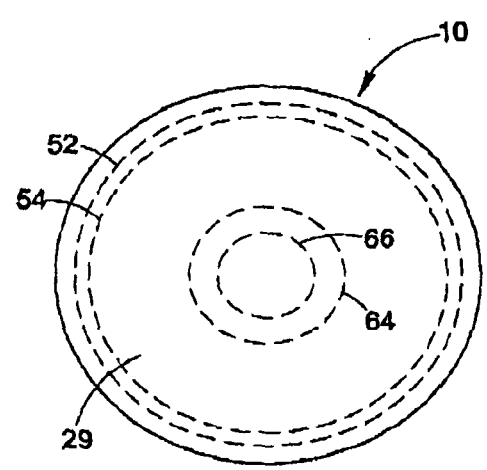
FIG. 4B is a schematic illustration of a diaphragm showing contact areas on a valve seat side of the diaphragm.
Figure 5A:
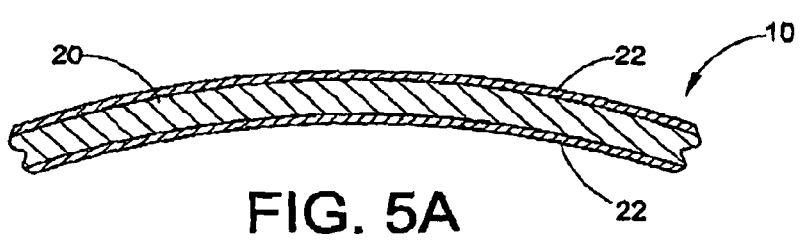
FIG. 5A is an enlarged view of the portion of FIG. 2 identified by the reference FIG. 5A illustrating a diaphragm with a coating disposed on both sides of the diaphragm.
Figure 5B:
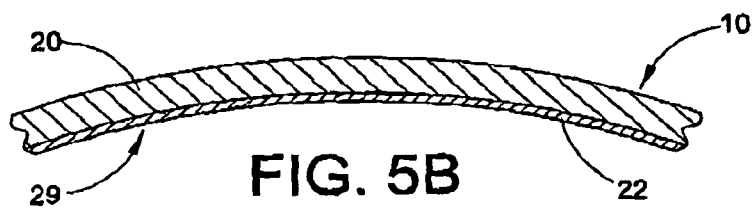
FIG. 5B is a schematic illustration of a diaphragm with a coating disposed on a valve seat side of the diaphragm.

FIG. 4B schematically illustrates where the valve body annular ridge 46 and where the valve seat 18 engage the valve seat side 29 of the diaphragm 10 when the valve arrangement 12 is assembled. Phantom lines 52, 54 illustrate the contact location of the valve body annular ridge 46 on the diaphragm 10 and phantom lines 64, 66 illustrate the contact location of the valve seat 18 engages diaphragm 10. Both the valve body annular ridge 46 and the valve seat 18 may contact the diaphragm 10 along the respective phantom lines or may contact an area of the diaphragm 10.

The coating 22 on the diaphragm 10 may be applied to one or both sides of the diaphragm 10. In the example illustrated by FIG. 5A, the coating 22 is disposed on both sides of the base material 20. In the example illustrated by FIG. 5B, the coating 22 is disposed only on the valve seat side 29 of the diaphragm 10.

Figure 6A:
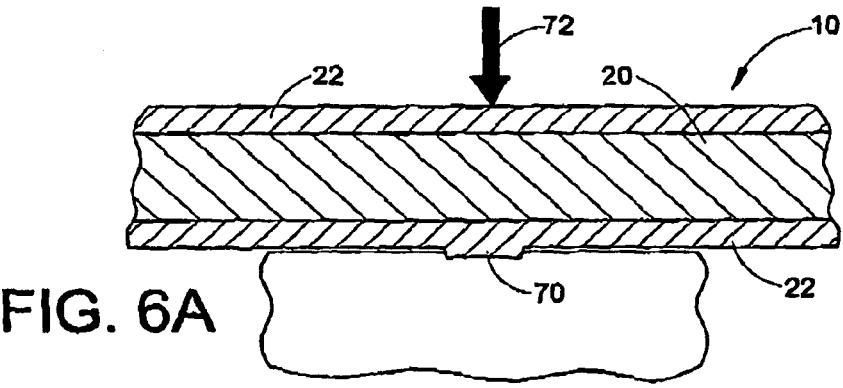
FIG. 6A is a schematic illustration that shows a coating on a diaphragm filling an imperfection in a valve member.
Figure 6B:
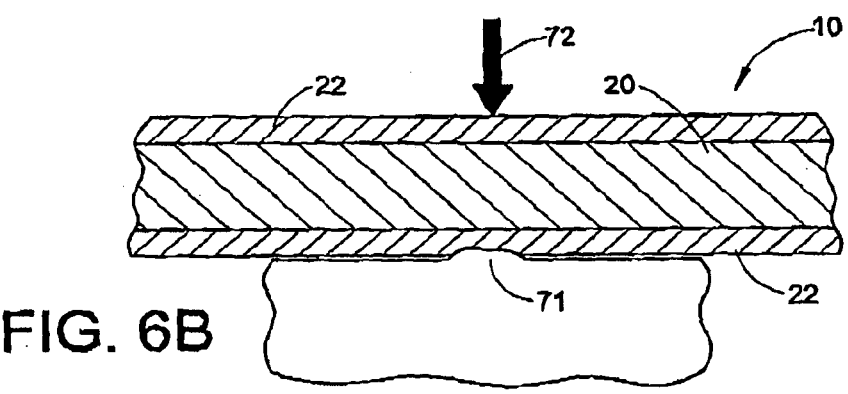
FIG. 6B is a schematic illustration that shows a coating on a diaphragm conforming to an imperfection in a valve member.

Referring to FIGS. 6A and 6B, the coating 22 facilitates a high integrity seal between the diaphragm 10 and the valve body 26 and/or the diaphragm and the valve seat 18 (which may be integrally formed with the valve body), even when the surfaces of the diaphragm, the valve body and/or the valve seat include imperfections. Examples of imperfections include voids 70 (FIG. 6A), such as for example, scratches, and bumps 71 (FIG. 6B). In the examples illustrated by FIGS. 6A and 6B, the valve seat 18, valve body 26, bonnet 34, or the diaphragm member 18 itself may include an imperfection, such as a void 70 or a bump 71. When a force (indicated by arrow 72) is applied to the diaphragm 10, the softer coating 22 fills the void 70 or conforms around the bump 71 to thereby inhibit leakage. As a result, a metallic valve body 26 that includes an integrally formed valve seat 18 may be used with a low actuation force actuator. In addition, with an integrally formed seat, no secondary operations are required to connect a seat 18 to the valve body 26.

Figure 7:
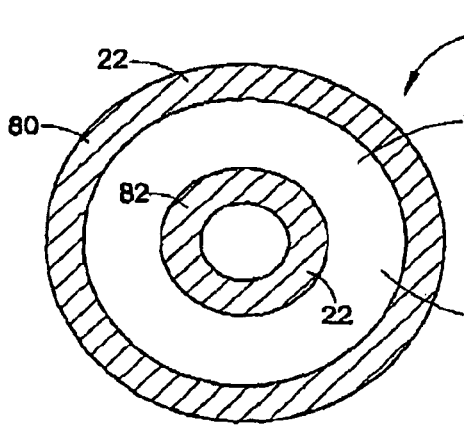
FIG. 7 is a schematic illustration of a coating pattern on the valve seat side of a diaphragm.
Figure 8:
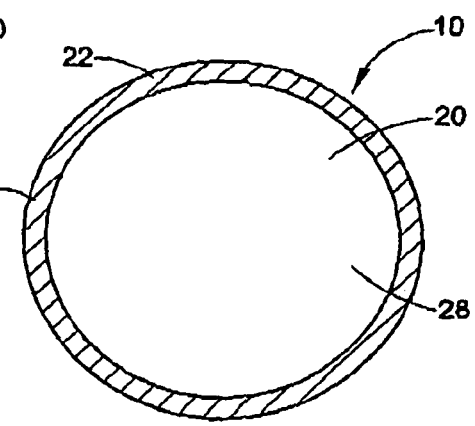
FIG. 8 is a schematic illustration of a coating pattern on the actuator side of a diaphragm.

The coating 22 may be applied to the entire actuator side 28 and/or the entire valve seat side 29 of the diaphragm 10 or the coating may be applied in a pattern to one or both sides of the diaphragm. In the example of FIGS. 7 and 8, a pattern of coating 22 is applied to the diaphragm 10 generally only in areas where a seal is formed by the diaphragm 10 with the valve body 26, the valve seat 18, and the bonnet 34 (as illustrated in FIGS. 4A and 4B). It should be readily apparent, that the coating 22 may be applied in any pattern desired, such as for example, to generally match the sealing areas of valve arrangements with various configurations.

The coating 22 may also be applied in a buffer region surrounding the areas where a seal is formed. By limiting the area where the coating 22 is applied to the diaphragm 10, wetting of the coating by fluid that flows through the valve arrangement 12 is reduced. In the example of FIG. 7, an outer ring 80 of coating 22 is applied to the valve seat side 29 of the diaphragm 10. The illustrated outer ring 80 of coating covers the area (illustrated by phantom lines 52, 54 in FIG. 4B) of the diaphragm 10 where the valve body annular ridge 46 engages the diaphragm. In the illustrated embodiment, the outer ring 80 is wider than the area where the valve body 26 engages the diaphragm 10 to ensure proper sealing even if alignment of the diaphragm and the valve body is not precise. In one embodiment, the outer ring 80 is sized to be the same width, or slightly narrower than the area where the valve body annular ridge 46 engages the diaphragm 10. In this embodiment, wetting of the outer ring 80 of the coating 22 by process fluid is substantially eliminated.

In the example of FIG. 7, an inner ring 82 of coating 22 is applied to the valve seat side 29 of the diaphragm 10. The illustrated inner ring 82 of coating covers the area (illustrated by phantom lines 64, 66 in FIG. 4B) of the diaphragm 10 where the valve seat 18 engages the diaphragm. In the illustrated embodiment, the inner ring 82 is wider than the area where the valve seat 18 engages the diaphragm 10 to ensure proper sealing even if alignment of the diaphragm and the valve seat is not precise. In one embodiment, the inner ring 82 is sized to be the same width, or slightly narrower than the area where the valve seat 18 engages the diaphragm 10. In this embodiment, wetting of the inner ring 82 of the coating 22 by process fluid when the diaphragm valve is closed is substantially eliminated.

In the example of FIG. 8, a ring 88 of coating is applied to the actuator side 28 of the diaphragm 10. The illustrated ring 88 of coating 22 covers the area (illustrated by phantom line 50 in FIG. 6) of the diaphragm 10 where the bonnet 34 engages the diaphragm. In the illustrated embodiment, the ring 88 is wider than the area where the bonnet 34 engages the diaphragm 10 to ensure proper sealing even if alignment of the diaphragm and the bonnet is not precise. In one embodiment, the ring 88 of coating 22 is sized to be the same width, or slightly narrower than the area where the bonnet 34 engages the diaphragm.

By patterning the coating 22 on the diaphragm 10 only in areas where a seal is formed between the diaphragm 10 and another member, the potential for particle generation and the overall surface area of polymer coating exposed to process fluid is reduced. Reducing the exposed coating surface area reduces the amount of process fluid that could potentially be absorbed by the coating 22 and thereby reduces the possibility that purge performance will be compromised by using a coated diaphragm 10.

In one exemplary embodiment, the valve body 26 comprises a metallic member, the valve seat 18 is an integrally formed metallic portion of the valve body 26, the diaphragm 10 comprises a metallic member, and the coating 22 comprises a self-assembled monolayer. In this embodiment, the coating 22 acts as a seal between the metallic valve seat 18 and/or the metallic valve body 26. If the seal provided by the diaphragm coating 22 is damaged, for example, by contamination or an environmental problem, the diaphragm 10 can be easily removed and replaced with a new coated diaphragm that provides a fresh seal. The inclusion of an integrally formed metallic seat 18 allows for an increased flow of process fluid as compared with valve bodies that include staked-in plastic valve seats. The flow is higher with an integral seat, because the combination of the structure needed to stake-in the valve seat and the valve seat itself is larger than an integral valve seat and the valve porting can thus be made larger for a given valve body size.

Figure 9:
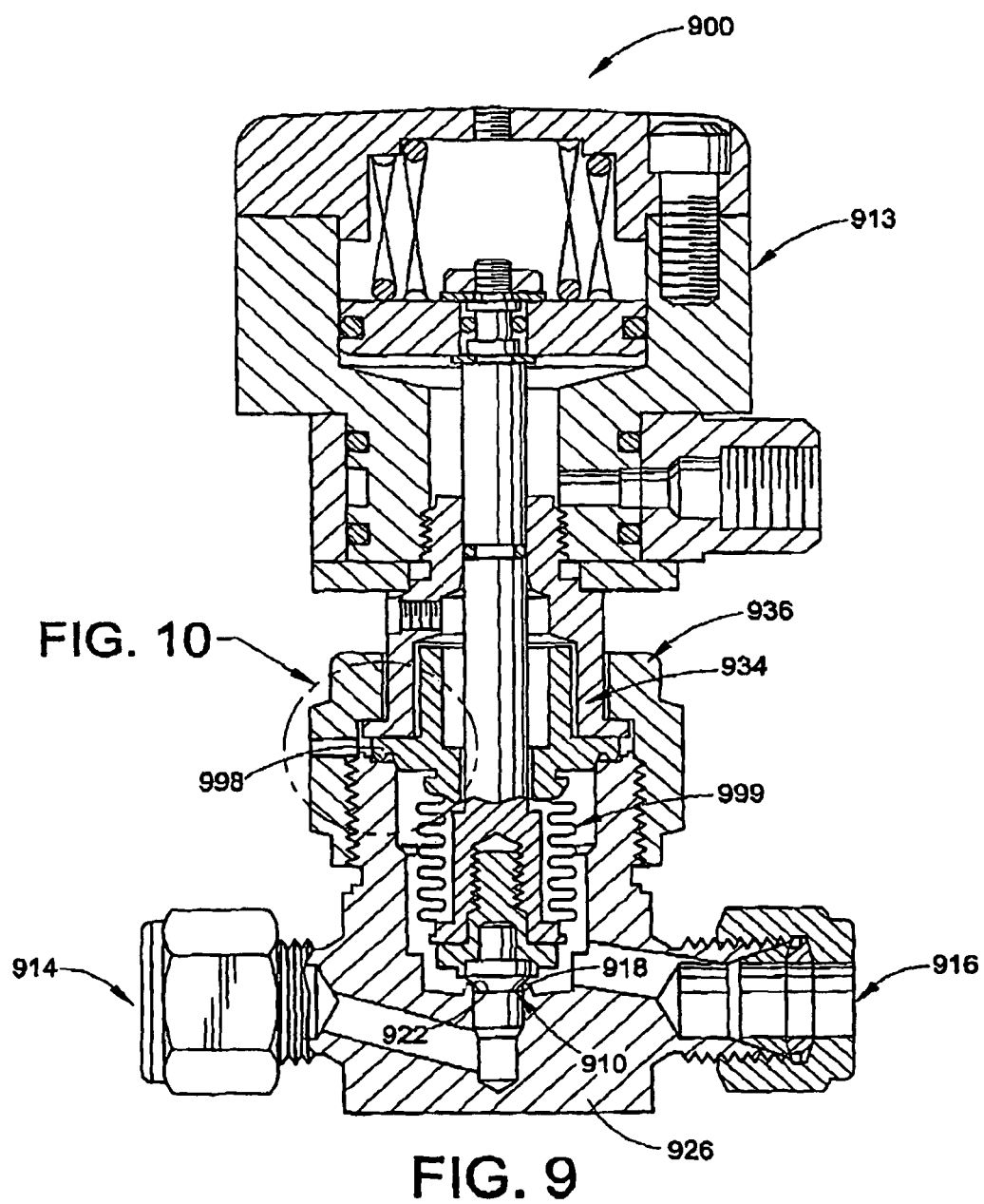
FIG. 9 is a cross-sectional view of a bellows valve.
Figure 10:
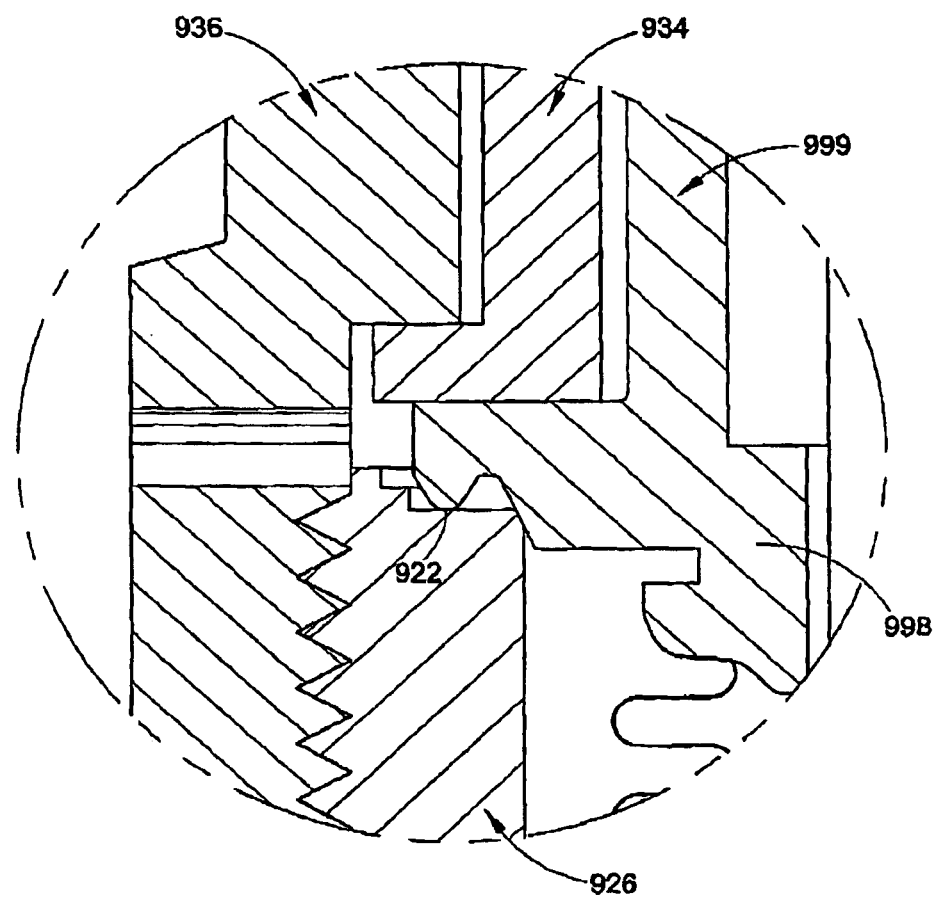
FIG. 10 is an enlarged portion of FIG. 9 as indicated in FIG. 9.

FIGS. 9 and 10 illustrate another exemplary valve structure on which this invention can be practiced. The valve 900 shown in FIG. 9 is described in U.S. Pat. No. 4,687,017 to Danko et al. U.S. Pat. No. 4,687,017 is incorporated herein by reference in its entirety.

Referring to the exemplary embodiment of FIG. 1, a coated valve stem tip 910 is used in a bellows valve arrangement 900 that includes a pneumatic actuator 913, an inlet port 914, an outlet port 916, and a valve seat 918. It should be readily apparent that the illustrated inlet port 914 could function as an outlet port and the illustrated outlet port 916 could function as an inlet port. Furthermore, it should be readily apparent, that the valve stem tip 910 could be used in a variety of different types of valve arrangements, such as for example, but not limited to, manually actuated valve arrangements, electrically actuated valve arrangements, and normally open or normally closed valve arrangements. Further, the coated valve stem tip 910 can be used in a valve that does not include a bellows.

In the exemplary embodiment of FIG. 9, the valve stem tip 910 comprises a metallic member or substrate. A coating indicated by reference number 922 is disposed on the metallic member to aid in sealing an interface between the valve stem tip 910 and the valve seat 918. For example, the coating may be a self-assembled monolayer coating.

In the embodiment illustrated by FIG. 9, the valve seat 918 is an annular seat member that is integral with a valve body 926. In another embodiment, the seat 918 is a separate member that is assembled with the valve body 926. The annular seat member 918 may be a plastic member, a metallic member, an annular metallic member that includes a thin polymer coating, or other suitable material(s). The thin polymer coating may be formed from the same material as the coating 922 on the valve stem tip 910. In one embodiment of the valve arrangement 912, the valve seat 918 includes the coating 922 and the valve stem tip 910 does not include the coating.

Referring to the exemplary embodiment of FIG. 9, the valve stem tip 910 is assembled with the valve body 926 to move into sealing engagement with the valve seat 918 and out of engagement with the valve seat. The valve body 926 and a bellows assembly 999 define a flow path from the inlet port 914 to the outlet port 916 when the valve stem tip 910 is not seated, thus allowing process fluid to flow from the inlet port 914 to the outlet port 916. The pneumatic actuator 913 is assembled with the valve body 926 and valve stem tip 910 for selectively moving the valve stem tip into and out of engagement with the valve seat 918. When the valve stem tip 910 is moved into engagement with the valve seat 918, the coating 922 contacts and seals with the valve seat.

Referring to FIG. 10, a bonnet 934 secures the bellows assembly 999 to the valve body 926 and a bonnet nut 936 clamps the bonnet 934 and bellows assembly 999 to the valve body 926. By including the coating 922 on the mounting member 998 of the bellows assembly 999 in the area where the valve body 926 engages the mounting member, the amount of force required to properly seal the bellows assembly 999 to the valve body 926 is reduced. In addition, the range of acceptable forces that will properly seal the bellows assembly 999 with the valve body 926 is broadened. The coating 922 on the periphery of the bellows assembly 999 acts as a seal between the mounting member 999 and the valve body 926. If desired, the polymer coating of this invention can be applied to the valve body 926 in addition to, or in lieu of, coating 922 on the mounting member 998 of the bellows assembly.

The coating 922 facilitates a high integrity seal between the bellows assembly 999 and the valve body 926 and/or the valve stem tip 910 and the valve seat 918, even when the surfaces of the diaphragm, the valve body and/or the valve seat include imperfections. The coating 922 may be applied to the entire valve stem tip 910 and/or mounting member 998 or the coating may be applied in a pattern. A pattern of coating 922 may be applied to the valve stem tip generally only in areas where a seal is formed by the valve stem tip 910 with the valve seat 918. A pattern of coating 922 may be applied to the mounting member 998 only in areas where a seal is formed between the mounting member 998 and the valve body 926.

The coating 922 may also be applied in a buffer region surrounding the areas where a seal is formed. By limiting the area where the coating 922 is applied to the valve stem tip 910, wetting of the coating by fluid that flows through the valve arrangement 12 is reduced.

A ring of coating 922 may be applied to the valve stem tip to cover the area where the valve seat 918 engages the valve stem tip. The ring may be wider than the area where the valve seat 918 engages the valve stem tip to ensure proper sealing even if alignment of the diaphragm and the valve seat is not precise. In one embodiment, the ring is sized to be the same width, or slightly narrower than the area where the valve seat engages the valve stem tip 910. In this embodiment, wetting of the ring of the coating 922 by process fluid when the valve is closed is substantially eliminated.

In one exemplary embodiment, the valve body 926 comprises a metallic member, the valve seat 918 is an integrally formed metallic portion of the valve body 926, the mounting member 998 of the bellows assembly 999 comprises a metallic member, and the coating 922 comprises a self-assembled monolayer. In this embodiment, the coating 922 acts as a seal between the metallic valve seat 918 and/or the metallic valve body 926.

A self assembled monolayer can be used on one or more seal surface of a wide variety of different couplings. Examples of couplings that can be modified to include self-assembled monolayer seal surfaces include, but are not limited to, fittings that clamp or sandwich a ring, such as VCR fittings, ferrule type fittings, flare-type fittings, etc.

Figure 11:
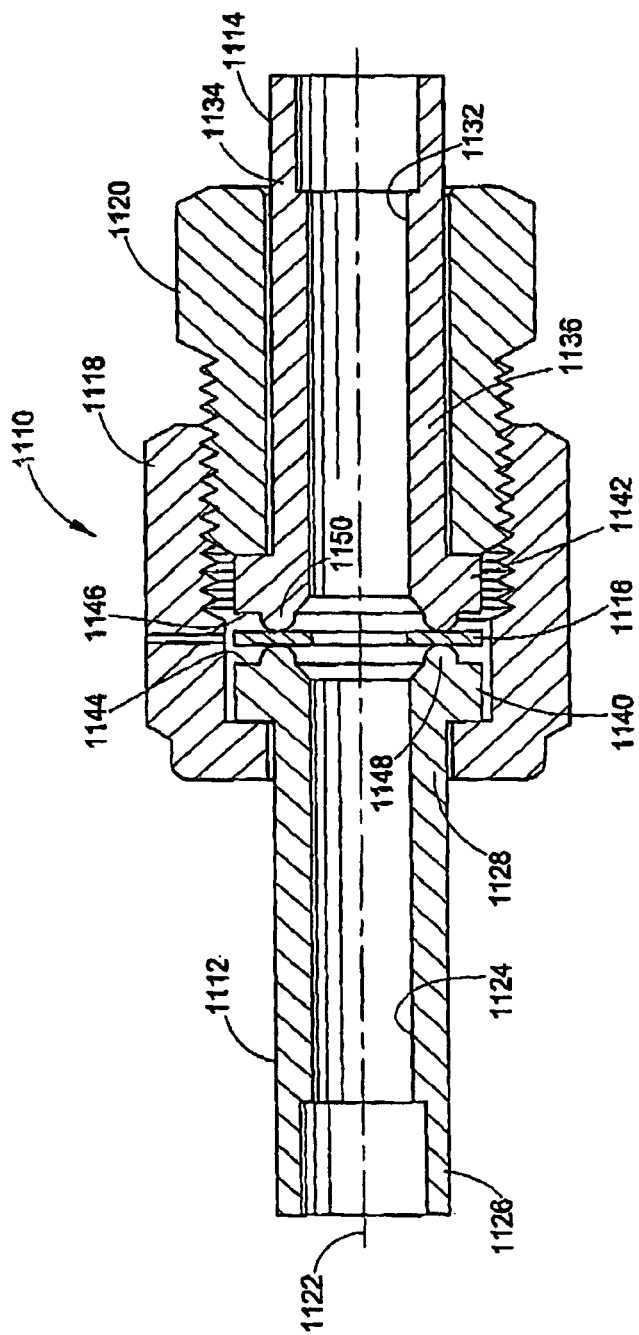
FIG. 11 is a cross-sectional view of a fitting.
Figure 12:
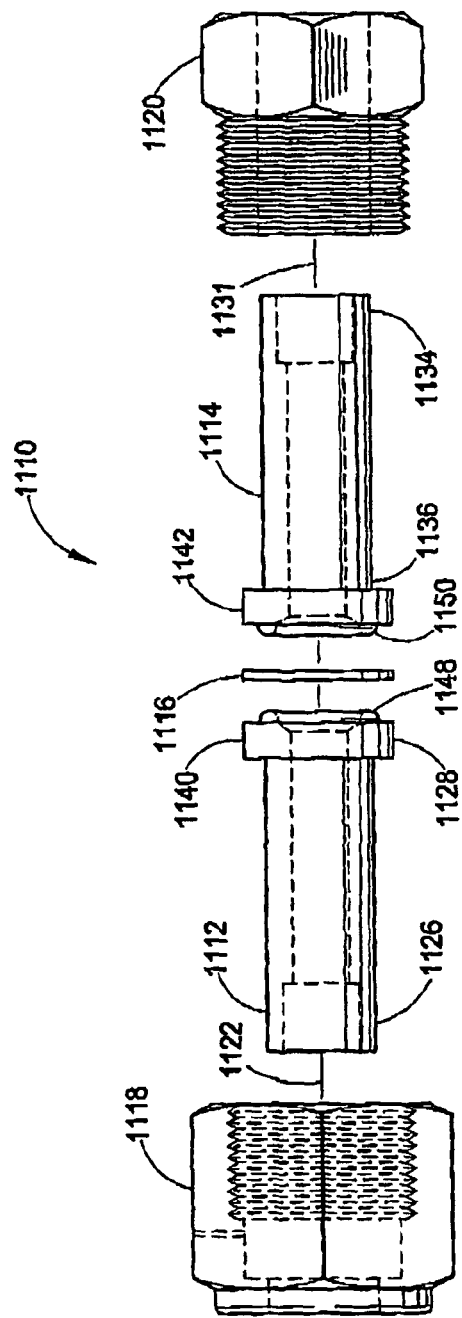
FIG. 12 is an exploded, side elevational view of the fitting shown in FIG. 11.
Figure 13:
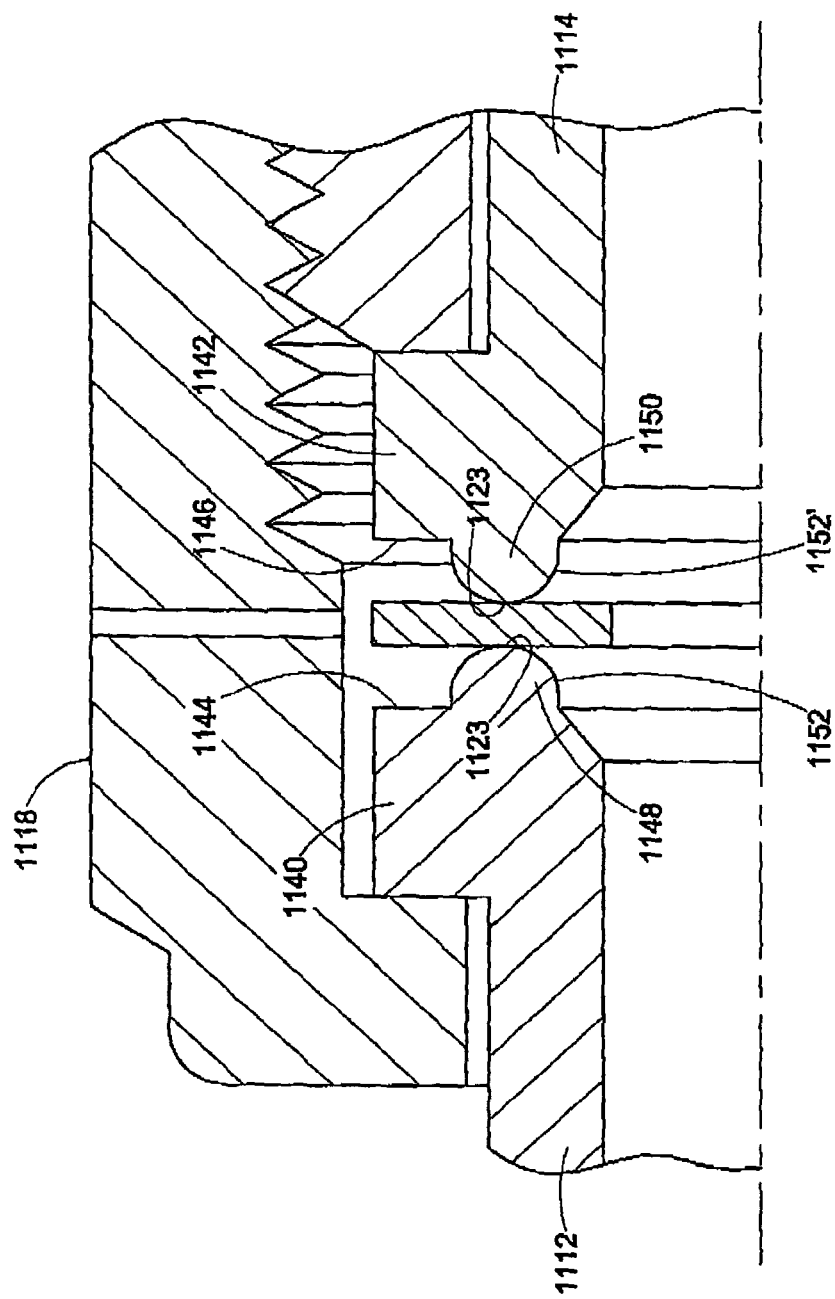
FIG. 13 is a view showing an enlarged portion of the fitting shown in FIG. 11.

FIGS. 11-13 illustrate an exemplary fitting structure on which this invention can be practiced. The fitting shown in FIGS. 11-13 is described in U.S. Pat. No. 3,521,910 to Callahan et al. U.S. Pat. No. 3,521,910 is incorporated herein by reference in its entirety.

Referring initially to FIG. 11, there is shown a longitudinal cross-sectional view of a coupling. The coupling, generally indicated at 1110 is pictured in the fully made-up condition, and is comprised of a first coupling component 1112, a second coupling component 1114, a sealing gasket 1116, a coupling nut 1118, and a gland nut 1120.

In an exemplary embodiment as shown in FIG. 11, the coupling component 1112 and 1114 are identical. Coupling component 1112 includes an axis 1122, a bore 1124, a first end 1126 and a second end 1128. Similarly, the second coupling component 1114 of FIG. 1 includes an axis 1131, a bore 1132, a first end 1134 and a second end 1136. At the respective second ends 1128, 1136 of each of the coupling components there are provided generally radially extending flanges 1140, 1142 having end faces 1144, 1146, disposed generally transverse to the respective axes 1122, 1131. Extending axially from end faces 1144, 1146, respectively are ribs 1148, 1150.

As shown in the enlarged cross-sectional view of FIG. 13, ribs 1148, 1150 include each a sealing surface 1152 1152' defined by a radius.

The coupling components 1112, 1114 are adapted to be disposed in end-to-end relation with the respective ribs 1148, 1150 in opposition to one another. A generally annular sealing gasket 1116 is disposed between the sealing surfaces 1152, 1152' of ribs 1148, 1150 and coacts with these surfaces in order to provide a fluid-tight coupling.

Sealing gasket 1116 is defined by a bore or aperture having a diameter substantially equal to the diameter of bores 1124, 1132. The outside diameter of sealing gasket 1116 is approximately equal to the outside diameter of flanges 1140, 1142.

Referring to the exemplary embodiment of FIG. 11, a coated sealing gasket 1116 is used in the coupling 1110. For example, the gasket may include a self-assembled monolayer coating. It should be readily apparent, that the sealing gasket 1116 could be used in a variety of different types of fittings. For example, the coated sealing gasket 1116 can be used in a fitting that does not include the ribs 1148, 1150.

In the exemplary embodiment of FIG. 11, the sealing gasket 1116 comprises a metallic member or substrate. A coating indicated by reference number 1123 is disposed on the metallic member to aid in sealing the interfaces between the sealing gasket 1116 and the coupling components 1112, 1114.

The coupling components 1112, 1114 may be plastic members, metallic members or metallic members that include a thin polymer coating, or other suitable materials. The thin polymer coating may be formed from the same materials as the coating 1123 on the sealing gasket 1116. In one embodiment of the coupling arrangement 1110, the coupling components 1112, 1114 include the coating 1123 and the sealing gasket 1116 does not include the coating.

By including the coating 1123 on the sealing gasket 1116 in the area where the coupling components 1112, 1114 engage the sealing gasket 1116, the amount of force required to for a proper seal is reduced. In addition, the range of acceptable forces that will properly seal the coupling components 1112, 1114 with the sealing gasket 1116 is broadened.

The coating 1123 facilitates a high integrity seal between the sealing gasket 1116 and the coupling components 1112, 1114, even when the surfaces of the sealing gasket 1116 and/or the coupling components 1112, 1114 include inperfections. The coating 1123 may be applied to the entire sealing gasket 1116 or the coating may be applied in a pattern. A pattern of coating 1123 may be applied to the sealing gasket 1116 generally only in areas where a seal is formed by the gasket 1116 with the coupling components 1112, 1114.

The coating 1123 may also be applied in a buffer region surrounding the areas where a seal is formed. By limiting the area where the coating 1123 is applied to the sealing gasket 1116, wetting of the coating by fluid that flows through the coupling arrangement 1110 is reduced.

Rings of coating 1123 may be applied to the both sides of the sealing gasket 1116 to cover the areas where the sealing gasket 1116 engages the coupling components 1112, 1114. The ring may be wider than the area where the sealing gasket 1116 engages the coupling components 1112, 1114 to ensure proper sealing even if alignment of the sealing gasket and the coupling components 1112, 1114 is not precise. In one embodiment, the ring is sized to be the same width, or slightly narrower than the area where the sealing gasket engages the ribs 1148, 1150. In this embodiment, wetting of the ring of the coating 1122 by process fluid is substantially eliminated. The coating 1123 may be applied such that the coating does not extend radially inward from the contact area and may extend radially outward from the contact area and still substantially eliminate wetting of the coating.

Figure 14:
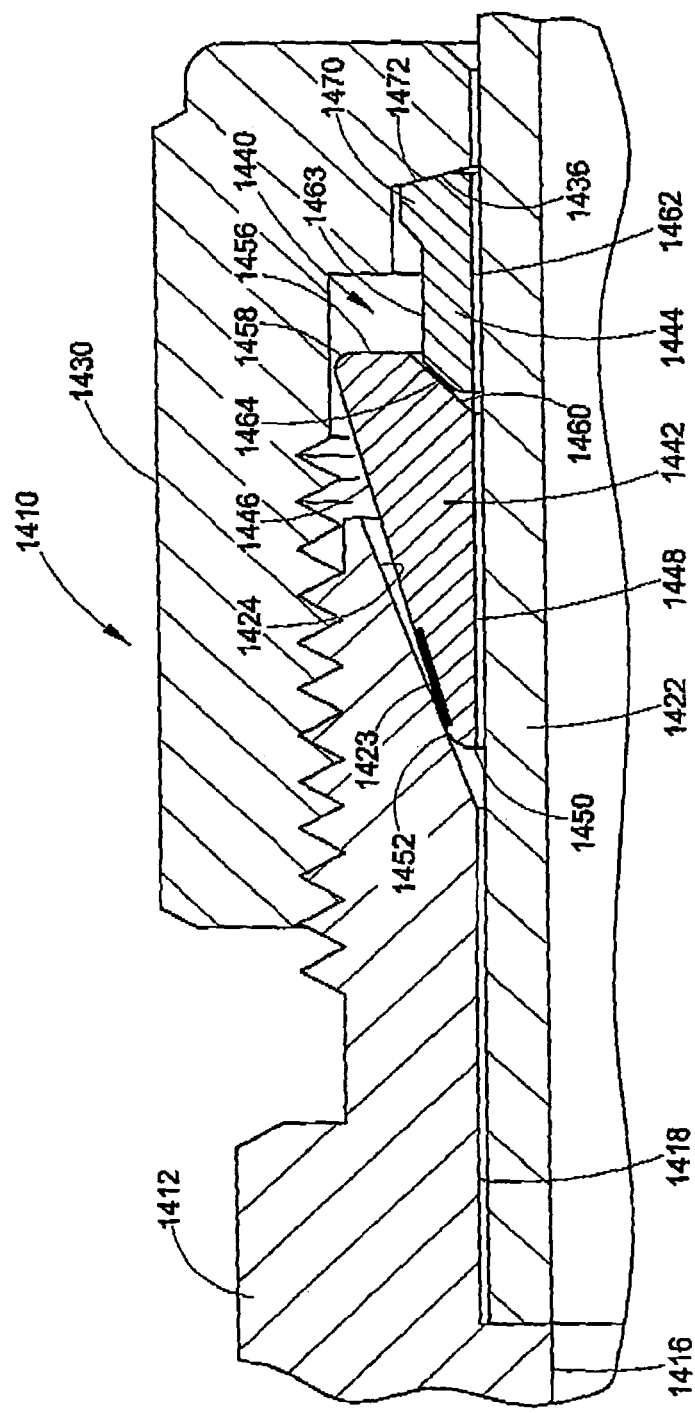
FIG. 14 is a cross-sectional view of a ferrule-type fitting.

FIG. 14 illustrates another exemplary fitting structure on which this invention can be practiced. The fitting shown in FIG. 14 is described in U.S. Pat. No. 3,103,373 to Lennon et al. U.S. Pat. No. 3,103,373 is incorporated herein by reference in its entirety.

FIG. 14 shows a ferrule-type fitting indicated generally at 1410. The 1412 includes a coupling body 1412. Extending longitudinally through the body 1412 is a substantially cylindrical passageway indicated generally at 1416. The body 1412 includes a counterbore 1418. The counterbore 1418 at its outer terminal portion is provided with a coaxial annular tapered or frustoconical camming mouth 1424. The fitting 1410 includes a coupling nut 1430 with a frusto-conical driving or thrust surface 1436. The annular tapered camming mouth 1424, the internal surfaces of coupling nut 1430 and an external surface of a tube 1422, together define an annular chamber 1440 within which front and back ferrules 1442 and 1444 respectively are adapted to be received.

The configuration of the front ferrule 1442 may be that of a hollow right circular conical frustum with a smoothly tapered annular external surface 1446 and a generally cylindrical axial bore 1448 of a size to fit slidably upon the tube 1422. The forward terminus of the front ferrule 1442 may define a generally flat radial front face 1450 which is merged with tapered surface 1446 by a smoothly curved apical zone 1452. The forward end of the front ferrule 1442 is so proportioned that the apical zone 1452 is adapted initially to seat against the annular tapered camming mouth 1424. The rearward terminus of the front ferrule provides a generally flat radial base surface 1456 joined to the tapered surface 1446 by a smoothly curved surface 1458. The bore 1448 of front ferrule 1442 is joined to base surface 56 by an annular tapered or generally frusto-conical camming mouth 1460.

The back ferrule 1444, may be an annular element that provides a central longitudinally extending bore 1462 of about the same diameter as that of the bore 1448 when both ferrules are undeformed. The external surface of the back ferrule is generally cylindrical throughout its mediate section 1463, but provides a tapered or frusto-conical surface 1464 at its forward end portion adapted to be received within the tapered camming mouth 1460. The back ferrule 1444 seats against the second camming mouth 1460.

The rearward end portion of the back ferrule is formed with an annular external radially extending flange 1470 which presents a tapered or generally frusto-conical back face 1472 opposed to and adapted to mate with surface 1436 of the nut 1460. When the fitting is pulled-up, the tapered surface 1446 seals against the camming mouth 1424. The front and back ferrules 1442, 1444 grip and seal the tube 1422.

A coating 1423, such as a self-assembled monolayer coating can be applied to any of the sealing surfaces of the fitting 1410. For example, the coating may be applied to the camming mouth 1424, to the front ferrule 1442, the back ferrule 1444, and/or the tube 1422. In the example illustrated by FIG. 14, a coated front ferrule 1442 is used in the coupling 1410. It should be readily apparent, that a coated ferrule 1442 could be used in a variety of different types of fittings. For example, a coated ferrule can be used in single ferrule fittings, fittings that have more than two ferrules, and two ferrule fittings that are configured differently than the fitting shown in FIG. 14.

In the exemplary embodiment of FIG. 14, the coated ferrule 1442 comprises a metallic ring. A coating indicated by reference number 1423 is disposed on the metallic member to aid in sealing the interface between the ferrule 1442 and the camming mouth 1424. The fitting body 1412 may be a metallic member or a metallic member that includes a thin polymer coating, or other suitable materials. The thin polymer coating may be formed from the same materials as the coating 1423 on the ferrule 1442. In one embodiment of the fitting body 1410, includes the coating 1423 and the ferrule 1442 does not include the coating.

By including the coating 1423 on the ferrule 1442 in the area where the camming mouth 1424 engages the ferrule 1442, the amount of force required to for a proper seal is reduced. In addition, the range of acceptable forces that will properly seal the ferrule 1442 with the camming mouth 1424 is broadened.

The coating 1423 facilitates a high integrity seal between the ferrule 1442 and the camming mouth 1424, even when the surfaces of the ferrule 1442 and/or the camming mouth 1424 include inperfections. The coating 1423 may be applied to the entire ferrule 1442, the coating may be applied to the tapered surface 1446 of the ferrule, or the coating may be applied in a pattern. A pattern of coating 1423 may be applied to the ferrule 1442 generally only in areas where a seal is formed by the ferrule 1442 with the camming mouth. In another embodiment, the coating 1423 may be patterned on the camming mouth, or completely cover the camming mouth and the coating on the ferrule may be omitted.

The coating 1423 may also be applied in a buffer region surrounding the areas where a seal is formed. By limiting the area where the coating 1423 is applied to the ferrule 1442 and/or the camming mouth 1424, wetting of the coating by fluid that flows through the coupling arrangement 1110 is reduced.

A ring of coating 1423 may be applied to the ferrule 1442 and/or the camming mouth 1424 to cover the areas where the ferrule 1442 engages the camming mouth 1424. The ring may be wider than the area where the ferrule 1442 engages the camming mouth 1424 to ensure proper sealing. In one embodiment, the ring is sized to be the same width, or slightly narrower than the area where the ferrule 1442 engages the camming mouth 1424. In this embodiment, wetting of the ring of the coating 1122 by process fluid is substantially eliminated. The coating 1423 may be applied such that the coating does not extend radially inward (axially further into the camming mouth) from the contact area and may extend radially outward toward the rear of the ferrule from the contact area and still substantially eliminate wetting of the coating.

Figure 15:
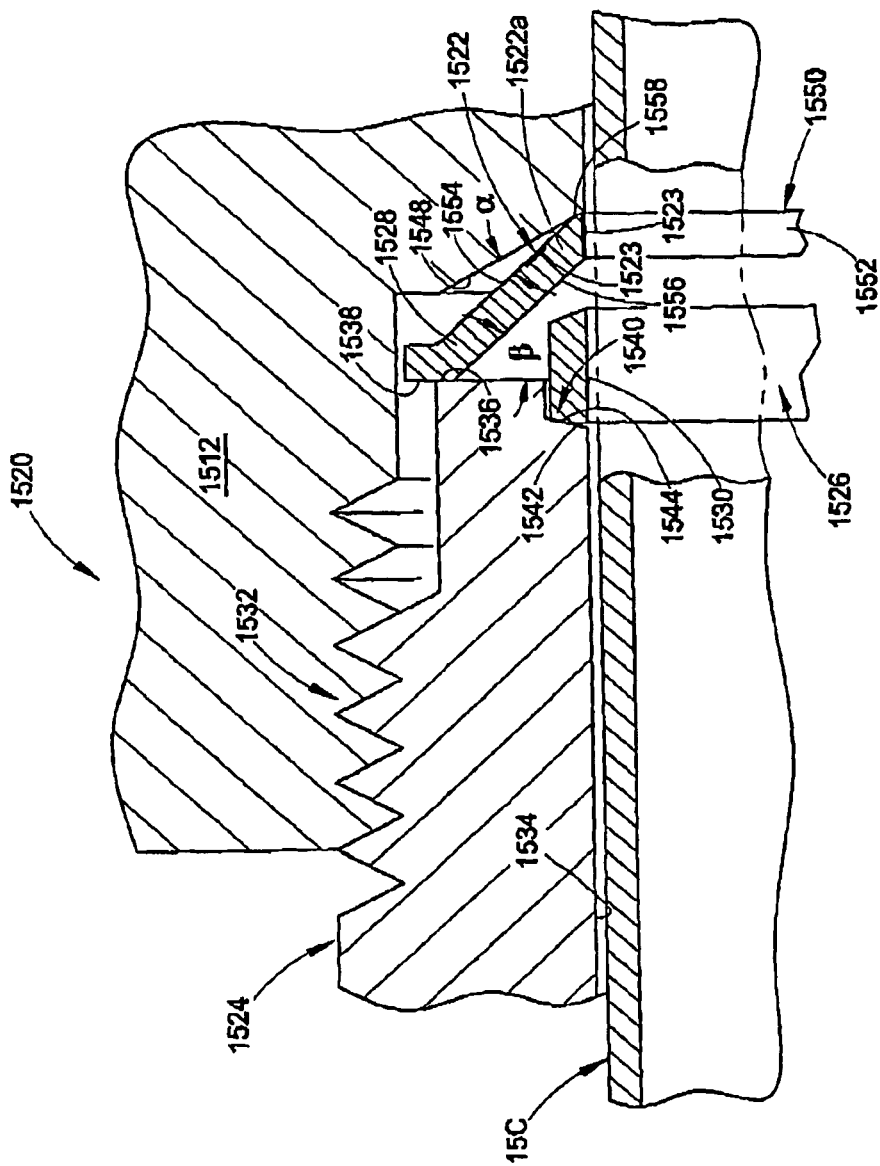
FIG. 15 is an enlarged illustration of a conduit gripping arrangement.
Figure 16:
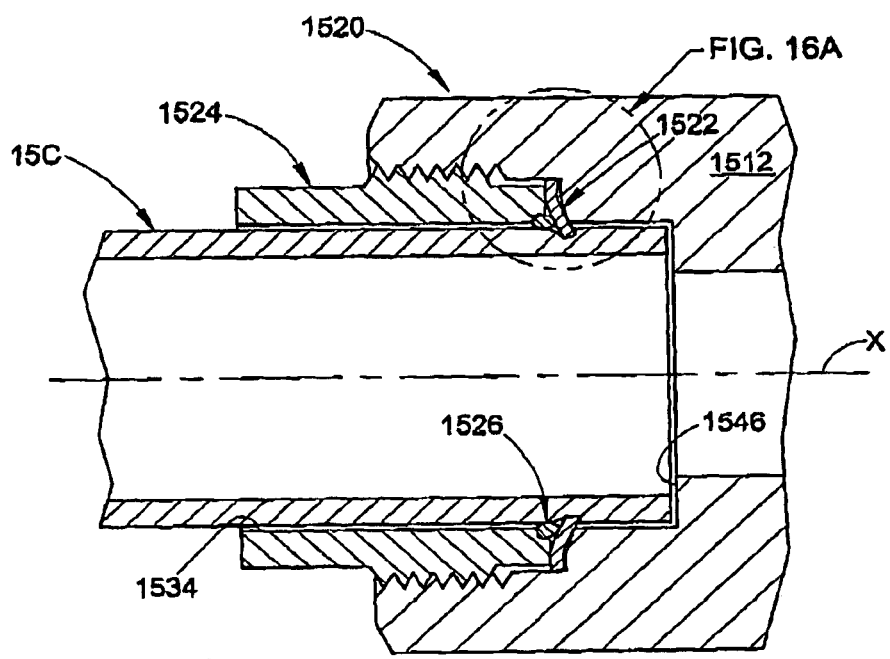
FIG. 16 illustrates the conduit gripping arrangement of FIG. 15 in a pulled-up condition.
Figure 16A:
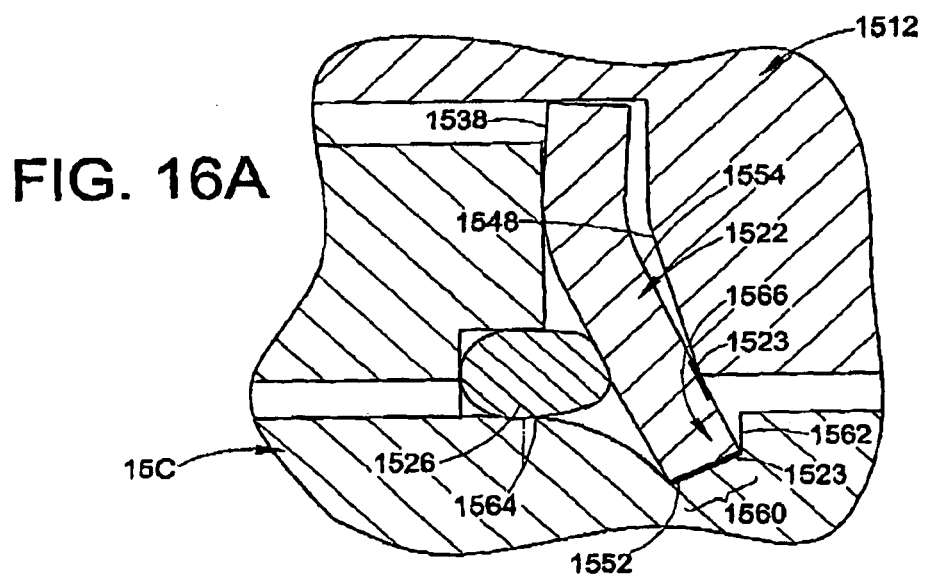
FIG. 16A is an enlarged view of the circled portion of FIG. 16.

FIGS. 15, 16, and 16A illustrate another exemplary fitting connection assembly on which this invention can be practiced. The connection assembly 1520 in this embodiment comprises a conduit gripping device 1522 (also referred to herein as a conduit gripping member or conduit gripping device 1522), a drive member 1524 and an optional supporting member 1526, which in this embodiment may be realized in the form of a collet or swage ring 1526. When the supporting member 1526 is not included, the drive member 1524 may be shaped to engage the conduit gripping device in a similar manner. FIG. 15 illustrates this assembly in enlarged detail. In this embodiment, the gripping device 1522 may be realized in the form of a washer or spring body 1528. In one embodiment, the spring body 1528 may be in the form of a Bellville washer. The supporting member 1526 may be realized, for example, in the form of an annular ring-like device having a smooth interior cylindrical wall 1530 that is closely received about the conduit 15C outer surface. The drive member 1524 is provided with suitable structure for joining the drive member to the body 1512, in this embodiment the drive member 1524 and body 1512 include a threaded connection 1532 so that as the drive member 1524 is screwed and tightened into the body 1512, the gripping device 1522 tightly and strongly engages the conduit, and the supporting member 1526 also tightly grips and engages the conduit behind the gripping device. The supporting member 1526 provides mechanical support to the gripping device 1522, in some cases even if the drive member 1524 is loosened, and also provides isolation between the stress region or stress riser where the gripping device grips the conduit, and the down-conduit vibration or stress such as may occur from bending moments.

In the case of a threaded connection between the drive member 1524 and the body 1512, the drive member 1524 may act as a retaining device to hold the drive member, gripping device 1522 and supporting member 1526 together with the body 1512 as a preassembly or cartridge type assembly. For example, the drive member 1524 might be tightened to a finger tight condition. By allowing for a preassembled structure, the manufacturer can reduce the incidence of improper assembly of parts, such as for example forgetting to install the gripping device 1522 or installing it backwards. Even in the case where a threaded connection is not used between the drive member 1524 and the body 1512, there are alternative ways, such as an adhesive for example, to hold the fitting parts together as a preassembled fitting.

The drive member 1524 may include a smooth cylindrical wall 1534 that closely receives the conduit end when the fitting 1520 is going to be installed onto the conduit. The drive member 1524 further may include an inward optionally radial first drive surface 1536 that engages a radially outer flange 1538 of the gripping device 1522 during pull-up. The first drive surface 1536 may or may not contact the gripping ring 1522 in a finger-tight condition, though preferably it does. This drive surface also need not be planar or radial, but may have different contours and profiles depending on the nature of the drive forces to be applied to the gripping device 1522. The drive member 1524 may also include an optional pocket 1540 formed by a tapered second drive surface 1542 that is axially recessed from the first drive surface 1536. A rearward end of the collet ring 1526 may be received in this pocket 1540 so that during pull-up the tapered drive surface 1542 engages a driven surface 1544 of the supporting member 1526.

The drive member 1524 may include an optional extension portion that may be provided with wrench flats to facilitate tightening the drive member 1524 during pull-up. In an alternative embodiment, the drive member 1524 may be flush or even recessed from the outer surface of the body 1512, and a tool used that can turn the drive member so as to pull up the fitting 10.

Since the illustration of FIG. 15 is in the finger tight condition, it will be noted that the drive member 1524 will initially contact and move forwardly the outer flange 1538 of the gripping device 1522 before the forward end of the supporting member 1526 engages the gripping device 1522. In this manner, the gripping device 1522 is able to deform and spring load into position before the collet ring 1526 applies a significant load against the gripping device 1522, because once the collet ring begins to be compressed against the lower or radially inner portion 1522a of the gripping device 1522, pull-up will be nearly completed.

The body 1512 may be provided with a counterbore shoulder 1546 (FIG. 16) against which the conduit end is bottomed. The conduit end is slideably inserted through the drive member 1524, the supporting member 1526 and the gripping device 1522 up against the shoulder 1546 when the fitting 1520 is going to be connected to a conduit. The conduit may or may not tightly bottom or remain bottomed when the assembly is in a finger tight condition but it is usually desirable, although not required in all designs, that the conduit be bottomed against the shoulder 1546 by the time that pull-up is completed. The body 1512 may also be provided with a tapered face 1548 to facilitate action of the gripping device 1522 as will be further explained herein below.

As noted above, in the illustrated exemplary embodiment of FIG. 15, the conduit gripping member 1522 may be realized in the form of a conically shaped body 1528 which in some respects may be comparable to a spring washer. Accordingly, the conical body 1528 may include a central opening 1550 that is defined in this example by a radially inner cylindrical wall 1552, and that allows the conduit 15C to be slid there through during assembly of the fitting 1520. A common example of a spring washer geometry is a Belleville spring, although such geometry is only exemplary. Belleville springs often are used to provide a live-load or bias against a surface in a direction along a central longitudinal axis of the spring, in terms of FIG. 16 in a direction that is parallel to the axis X. Our concept in one embodiment is to use a spring washer approach to effect conduit grip and optionally a seal by a radial compression against the conduit outer surface brought about when the spring is axially loaded. An axial load against the conduit gripping member 1522 causes the washer-like device to deform to a flatter condition which produces an inward radial compression of the conduit gripping member against the conduit 15C. This concept of using a conduit gripping member such as in an exemplary form of a spring washer to effectively grip and optionally seal against an outer surface of a conduit is fully described in International Patent Application number PCT/US2006/024776 published as WO 2007/002576 A2 on Jan. 4, 2007 and fully incorporated herein by reference.

In the embodiment of FIG. 15, the conduit gripping member 1522 comprises two generally parallel frusto-conical walls 1554, 1556 that extend from the radially inner wall 1552 to the optional radial extension or flange 1538. A typical Belleville spring does not use the flange 1538, and the present inventions may be used with such conventional spring designs in many cases, or other spring or washer designs to name a few examples. The outer wall 1554 and the inner cylindrical wall 1552 converge at a front end or edge 1558 of the conduit gripping member 1522. This front edge 1558 may be but need not be a sharp edge, and preferably may be of such configuration and shape as to indent or embed into the outer surface of the conduit when the fitting 1520 is pulled up. By indenting into the surface, the conduit gripping member 1522 creates a significant stress riser and further exhibits a high gripping strength against any tendency for the conduit 15C to try to back out of the fitting, especially under pressure. For lower pressure applications, however, it may not be necessary to have a biting or indenting type effect on the conduit. The conduit gripping member 1522 may have many alternative geometries and configurations to promote the grip and seal functions as needed and as needed for particular overall fitting 1520 configurations and designs.

The conduit gripping member 1522 initially engages the tapered interior surface 1548 of the body 1512 down near the conduit surface, as illustrated in FIG. 15 in the finger-tight condition of the fitting. The interior surface 1548 in this embodiment is frusto-conical so as to present a camming surface for the conduit gripping member 1522, and may also be used to provide a limit on the deflection of the conduit gripping member 1522 during pull-up. The forward or outer spring wall 1554 and the interior surface 1548 may define an included suitable angle α, while the rearward or inner spring wall 1556 and the first drive surface 1536 may define an included suitable angle β. In many cases, the angles α and β may be the same or nearly the same, but in other cases they may be different, depending on the design and operation of the conduit gripping member 1522 as well as the design and configuration of the drive surface 1536 and the camming surface 1548. The surfaces 1554 and 1548 cooperate to control deflection of the conduit gripping member 1522 in a manner desired to achieve the desired grip and optional seal against the conduit 15C outer surface. This control of the deflection may be further enhanced with the use of the optional radial extension 1538 that engages the first drive surface 1536. As the drive member 1524 is axially moved against the conduit gripping member 1522, axial movement of the forward edge 1558 is restricted by the body 1512, and so the spring washer begins to flatten, which in cross-section appears as the walls 1554, 1556 moving towards a more vertical orientation. This causes an inward contraction of the cylindrical wall 1552, in other words a decrease in its diameter, thus causing the forward edge 1558 to indent or bite into the conduit. The inner cylindrical wall 1552 may optionally to some extent swage or collet the conduit outer surface, but this is not necessary in this embodiment because the supporting member 1526 is provided for that purpose.

During pull-up, the supporting member 1526 is also moved forward axially and engages the inner portion of the conduit gripping member 1522. As tightening continues, the supporting member 1522 will plastically deform so as to collet or swage the conduit at a location that is axially rearward of the indented forward edge 1558 of the conduit gripping device 1522. Although the conduit gripping device 1522 may also be designed to have this colleting or swaging action, the use of the separate supporting member 1526 provides a beefier mass of material compressed against the conduit away from the stress region of the indented forward edge 1558. By collet is meant either a plastic or elastic deformation of the supporting member 1526 against the conduit to cause a radial strain into the conduit, resulting in a region of radial load axially behind the indented edge 58 to isolate the stress region of the indented edge from down-conduit vibration, bending moments and other forces that could weaken the ability of the conduit gripping member 1522 to grip the conduit 15C. Alternatively the supporting member 1526 could swage against the conduit outer surface where swaging is commonly referred to as a plastic deformation of the conduit to provide the radial strain into the conduit such that the conduit surface is radially compressed to a smaller diameter. For designs that use a colleting action, the radial strain into the conduit may accompany an elastic deformation and not necessarily a plastic deformation. Whether considered to be a swage, collet or other radial strain action, a notable outcome is that the supporting member 1526 helps isolate the stress region of the indented edge 1558 from down-conduit vibration, bending moments and other forces that could weaken the ability of the conduit gripping device 1522 to grip the conduit 15C.

Because the conduit gripping member 1522 does not necessarily fully plastically deform and stores potential energy as it is flattened, we consider this design to be live loaded, and further, the design allows for re-make of the fitting 1520, in other words, a fully tightened fitting may be untightened and then re-made with the same resulting conduit grip and seal as needed. Note further that as system pressure increases, the pressure force tends to push the conduit back out of the fitting 1520 (as viewed in FIG. 15, from right to left for example). For designs in which the conduit gripping member 1522 convex side faces the high side system pressure, this tendency for the conduit to attempt to shift out of the fitting results in the conduit gripping member 1522 becoming even more compressed, causing the conduit gripping member 1522 to indent further into the conduit and also grip the conduit surface tighter. We call this action an energized conduit grip because the gripping strength increases with increasing system pressure.

With reference to FIGS. 16 and 16A, we illustrate an exemplary configuration of the fitting 1520 in a fully pulled up and tightened condition. It will be noted that the gripping member 1522 is somewhat flattened sufficiently to achieve the desired conduit gripping force by indenting into the conduit outer surface in the region 1560 (FIG. 16A) the now smaller cylindrical wall 1552 onto the conduit. In some cases this may include forming a shoulder 1562 by biting into the conduit surface. This shoulder 1562 will press against the front edge 1558 of the gripping member 1522 in response to pressure which will help prevent the conduit from backing out, and as pressure increases will cause the gripping member to grip even tighter. The supporting member 1526 is shown in a somewhat stylized fashion to illustrate that it has plastically deformed as a result of the forces incurred during pull-up. In this embodiment, the collet ring interior wall 1530 deforms to have a convex portion 1564 that collets and/or swages the conduit to provide the vibration isolation for the bite region 1560. The supporting member 1526 also engages the gripping member 1522 so as to support the gripping member should pressure tend to try to force the conduit back out of the fitting.

Although the exemplary embodiment illustrates the use of a conduit gripping member 1522 in the form of a single spring, in alternative designs more than one conduit gripping member 1522 may be used, and moreover an additional spring may be used to provide the colleting/swaging action of the supporting member 1526. Still further in additional alternative embodiments, the various drive surfaces, camming surfaces, contact surfaces and so on may be shaped or contoured as needed to achieve a desired tube grip and seal.

Note from FIG. 16A that the forward surface 1554 of the gripping member 1522 may be used to form a fluid tight seal against the camming surface 1548, and the indented region 1560 may also form a seal against the conduit surface. Other techniques for providing fluid tight seal may be used either separately or in combination with the gripping member 1522 and the supporting member 1526.

The indented gripping member 1522 thus provides grip and optional seal along the outer conduit surface (for example in the region generally indicated with the numeral 1560), the gripping member 1522 also provides a seal against the body surface 1548 as in the region generally indicated with the numeral 1566. These seals provide a fully sealed mechanical connection between the conduit end 15C and the fluid flow path through the body 1512.

In order to further increase the pressure rating of the fitting 1520, various parts or surfaces may be treated to be surface hardened as compared to the core material, and in some alternative designs various parts may be through hardened. One exemplary suitable process is low temperature carburization which produces a hardened surface that is substantially free of carbides in stainless steel alloys, however, other hardening processes including work hardening and non-low temperature carburizing, nitriding and others may be used as needed based on the desired hardness and corrosion resistance properties needed for a particular application. It may also be desirable in some designs to harden the entire surface of the conduit gripping member 1522, or alternatively the inward portion 1522a (FIG. 15) that will indent into and compress against the conduit 15C. This may be especially useful when the conduit comprises a hard alloy material, such as 2205 or 2507 duplex stainless steel, to name a few of many examples. It may also be desirable in some applications to harden the outer portion 1538 of the gripping member 1522 (FIG. 15), because just as the inner diameter of the spring washer 1522 tends to decrease as the spring is flattened, the outer diameter tends to increase. By hardening the outer portion 1538 this tendency to increase the diameter of the spring washer 1522 will be lessened. In other applications, it may be desirable to harden the supporting member 1526, portions or all of the drive member 1524 or both.

As noted, the conduit gripping member 1522 may have a basically conical shape, also called a Belleville or Belleville-like spring, which has a central hole 1550 or inner diameter through which a conduit can pass. Pressing the spring axially so as to flatten it causes that central hole to decrease in diameter such that its edge indents into the surface of the conduit and grips the conduit in place. Configured in a conduit fitting, the flattening of a gripping spring is accomplished by pulling-up or advancing the drive member 1524 relative to body such that surfaces adjacent to the gripping spring impart a toroidal flexure or flattening of the gripping spring. These adjacent surfaces start out having an angle α and β with the free and non-flexed conduit gripping spring, touching the spring generally at its radially inner most convex surface, and at its radially outermost concave surface. The gripping spring is configured in the conduit fitting with the convex side toward the source of system fluid elevated pressure. The gripping spring preferably maintains some amount of convexity toward the source of pressure, even after fitting pull-up. As that pressure attempts to push the conduit out from a pulled-up fitting, the inner diameter of the conduit gripping spring embeds deeper into the conduit surface. This provision of a greater grip in response to a greater pressure load to push out the conduit is called an energized conduit grip, a grip that increases to meet an increased conduit gripping requirement due to increasing system fluid pressure.

Embodiments that use a spring-like washer for the conduit gripping element 1522 may be used to effect various advantages for the fitting designer. The spring-like member 1522 may be tightened to a fully pulled-up condition as in FIG. 16 with a rather short stroke or displacement of the drive member 1524 relative to the body 12. For example, the embodiment of FIG. 15. may be fully made up with only a half-turn or even a quarter-turn of the drive member 1524 relative to the body. The use of the generally flat gripping member(s) 1522, even if more than one is used in a stacked configuration, provides a compact fitting design. The controlled deflection of the spring also facilitates the use and design of these fittings for thin walled conduits, as well has heavy walled conduits.

A coating 1523, such as a self-assembled monolayer coating can be applied to any of the sealing surfaces of the connection assembly 1520. For example, the coating 1523 may be applied to the tapered face 1548, to the conduit gripping device 1522, and/or the conduit 15C. In the example illustrated by FIG. 15, a coated conduit gripping device 1522 is used in the connection assembly 1520. It should be readily apparent, that a conduit gripping device 1522 could be used in a variety of different types of fittings.

In the exemplary embodiment of FIG. 15, the coated conduit gripping device 1522 comprises a metallic ring. A coating indicated by reference number 1523 is disposed on the metallic member to aid in sealing the interface between the conduit gripping device 1522 and the tapered face 1548 and/or the conduit 15C. The body 1512 may be a metallic member or a metallic member that includes a thin polymer coating, or other suitable materials. The thin polymer coating on the body (if included) may be formed from the same materials as the coating 1523 on the conduit gripping device 1522. In one embodiment of the body 1512 and/or the conduit 15C, includes the coating 1523 and the conduit gripping device 1522 does not include the coating.

By including the coating 1523 on the conduit gripping device 1522 in the area where the tapered face 1548 engages the conduit gripping device and/or the area where the conduit gripping device engages the conduit 15C, the amount of force required to for a proper seal is reduced. In addition, the range of acceptable forces that will properly seal the conduit gripping device 1522 with the tapered face 1548 and/or the conduit 15C is broadened.

The coating 1523 facilitates a high integrity seal between the conduit gripping device 1522 and the tapered face 1548 and/or the conduit 15C, even when the surfaces of the conduit gripping device 1522, the tapered face, and/or the conduit 15C include inperfections. The coating 1523 may be applied to the entire conduit gripping device 1522, or the coating may be applied in a pattern. A pattern of coating 1523 may be applied to the conduit gripping device 1522 generally only in areas where a seal is formed by the conduit gripping device 1522 with the tapered face 1548 and/or only in areas where a seal is formed by the conduit gripping device 1522 with the conduit 15C. In another embodiment, the coating 1523 may be patterned on the tapered face 1548, or completely cover the tapered face 1548 and the coating on the conduit gripping device may be omitted.

The coating 1523 may also be applied in a buffer region surrounding the areas where a seal is formed. By limiting the area where the coating 1523 is applied to the conduit gripping device 1522 and/or the tapered face 1548, wetting of the coating by fluid that flows through the connection assembly 1520 is reduced. In the example illustrated by FIG. 15, the pattern of coating may be on the outer wall 1554 and/or the cylindrical wall 1552.

A ring of coating 1523 may be applied to the conduit gripping device 1522 and/or the tapered face 1548 to cover the areas where the conduit gripping device 1522 engages the tapered face 1548. In one embodiment, the ring is sized to be the same width, or slightly narrower than the area where the conduit gripping device 1522 engages the tapered face 1548. In this embodiment, wetting of the ring of the coating 1523 by process fluid is substantially eliminated. The coating 523 may be applied such that the coating does not extend radially inward from the contact area and may extend radially outward and still substantially eliminate wetting of the coating.

A ring of coating 1523 may be applied to the conduit gripping device 1522 and/or the tube to cover the areas where the conduit gripping device 1522 engages the tube 15C. In one embodiment, the ring is sized to be the same width, or slightly narrower than the area where the conduit gripping device 1522 engages the tube 15C. In this embodiment, wetting of the ring of the coating 1523 by process fluid is substantially eliminated.

Figure 17:
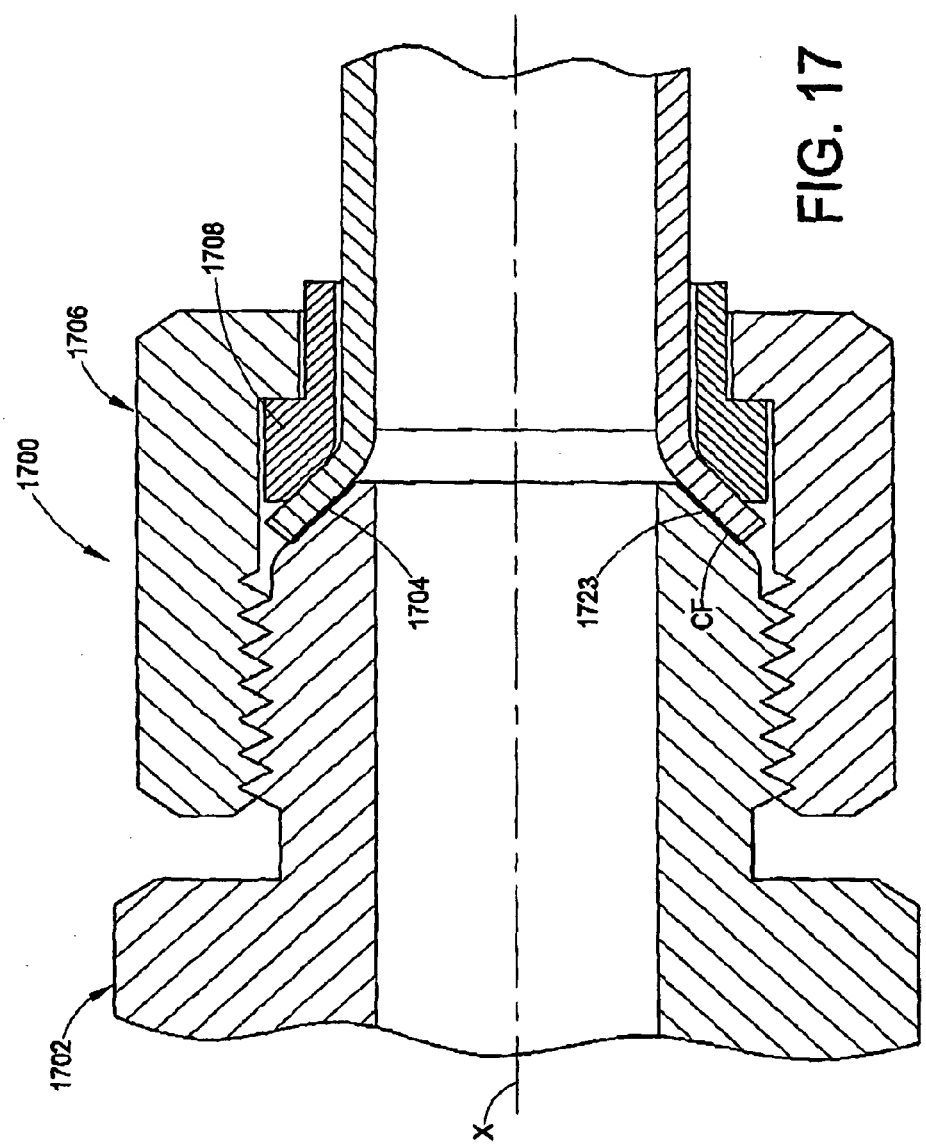
FIG. 17 is a cross-sectional view of a flared conduit end fitting.

FIG. 17 illustrates another exemplary fitting connection assembly on which this invention can be practiced. With reference to FIG. 17, a fitting 1700 for a flared conduit is illustrated. The fitting 1700 may be conventional in design or designed for a particular application and performance criteria, but in general such a fitting may include a body 1702 having a tapered forward end 1704. A nut 1706 cooperates with the body 1702 to pull-up the fitting to a fully made up condition as illustrated in FIG. 17. The nut 1706 may also cooperate with an optional gland member 1708. The gland member 1708, when used, applies a compressive force to the flared conduit end CF against the tapered surface 1704 of the body to form a fluid tight seal. For fittings that do not use a gland, the nut typically will have a drive surface that compresses the conduit end against the tapered surface of the body.

A coating 1723, such as a self-assembled monolayer coating, can be applied to any of the sealing surfaces of the fitting connection 1700. For example, the coating 1723 may be applied to the flared conduit end CF and/or the tapered surface 1704. In the example illustrated by FIG. 17, a coated tapered surface 1704 is used in the fitting connection 1700.

In the exemplary embodiment of FIG. 17, the optional gland member 1708 comprises a metallic ring. A coating indicated by reference number 1723 is disposed on the metallic member to aid in sealing the interface between the tapered surface 1704 and the flared conduit end CF. The conduit end may be a metallic or may be metallic with a thin polymer coating, or other suitable materials. The thin polymer coating on the conduit end CF (if included) may be formed from the same materials as the coating 1723 on the tapered surface 1704. In one embodiment, the body conduit end CF includes the coating 1723 and the tapered surface 1704 does not include the coating.

By including the coating 1723 on the conduit tapered surface 1704 in the area where the tapered surface 1704 engages the conduit end CF, the amount of force required to for a proper seal is reduced. In addition, the range of acceptable forces that will properly seal the tapered surface 1704 with the conduit end CF is broadened.

The coating 1723 facilitates a high integrity seal between the tapered surface 1704 and the conduit end CF, even when the surfaces of the tapered surface 1704 and/or the conduit end CF include imperfections. The coating 1723 may be applied to the entire gland member 1708, the tapered surface 1704 of the gland member, or the coating may be applied in a pattern. A pattern of coating 1723 may be applied to the tapered surface 1704 generally only in areas where a seal is formed by the tapered surface 1704 with the flared conduit end CF. In another embodiment, the coating 1723 may be patterned on an interior wall of the flared tube end CF, or completely cover the interior wall of the flared tube end and the coating on the tapered surface 1704 may be omitted.

The coating 1723 may also be applied in a buffer region surrounding the areas where a seal is formed. By limiting the area where the coating 1723 is applied to the tapered surface 1704 and/or the flared tube end CF, wetting of the coating by fluid that flows through the fitting 1700 is reduced. For example, a ring of coating 1723 may be applied to the tapered surface 1704 and/or the flared conduit end to cover the areas where the tapered surface 1704 engages the flared conduit end CF. In one embodiment, the ring is sized to be the same width, or slightly narrower than the area where the tapered surface 1704 engages the flared conduit end CF. In this embodiment, wetting of the ring of the coating 1723 by process fluid is substantially eliminated. The coating 1723 may be applied such that the coating does not extend radially inward from the contact area and may extend radially outward and still substantially eliminate wetting of the coating.

Self-Assembled Monolayer Coatings

In accordance with this invention, coating 22 on the diaphragm 10, valve stem tip 910, gasket 1116, and ferrule 1442 (and the analogous polymer coatings on other components) is formed from a self-assembled monolayer. Self assembled monolayers (SAMs) are surfaces consisting of a single layer of molecules on a substrate. Rather than having to use a technique such as chemical vapor deposition or molecular beam epitaxy to add molecules to a surface (often with poor control over the thickness of the molecular layer), self assembled monolayers can be prepared simply by adding a solution of the desired molecule onto the substrate surface and washing off the excess.

Compounds which form self-assembled monolayers can be described as functionalized macromolecules which include at least one functional group such as a silane, halosilane, silizane, siloxy, carboxyl, thio, amino, amido, etc., capable of bonding to the substrate being treated and an organic moiety which will self assemble with the organic moieties of like compounds also in contact with the substrate. Such organic moieties include alkyl, aryl or alkylaryl groups which can be unsubstituted or substituted with a variety of different groups such as halo, especially chloro and fluoro.

A common example of an SAM is an alkane thiol on gold. Sulfur has particular affinity for gold, with a binding energy in the range of 20-35 kcal/mol (85-145 kJ/mol). An alkane with a thiol head group will stick to the gold surface and form an ordered assembly with the alkyl chains packing together due to van der Waals forces. For alkyl thiols on gold, the extended alkyl chains typically orient with an angle of ~30 degrees from the perpendicular of the substrate, and are assumed to be in a fully extended linear arrangement. There has been a great deal of work done determining the process by which alkyl thiol on gold assemblies are produced. It is generally thought that alkyl thiol molecules first bind to the gold surface in a "lying down" position, where the alkyl chain tails of the molecules lie flat on the gold surface. The thiol interaction provides about 20-30 kcal/mol (85-130 kJ/mol) of driving force for the initial binding, which is modeled as a Langmuir binding isotherm. These binding events continue until the lying down molecules are dense enough on the surface to interact with each other. At some point the alkyl chains lift off the substrate and point outwards, tethered by the thiol anchor to the surface. There is a shift to a mixture of lying down molecules and island domains of upright allcyl chains, tilted at 30 degrees to the normal. At this stage binding kinetics become more complex and can no longer be modeled with a simple Langmuir binding isotherm. Over time the island domains merge and cover the bulk of the substrate, and the process can be compared to a 2-D crystallization process on a surface. Alkyl thiol SAMs exhibit grain boundaries and defects even after long periods of assembly. The initial stage of SAM formation usually takes minutes or less under the normal conditions of 0.1-10 mmol/L thiol concentration in a solvent. More ordering of the assembly can take place over days or months, depending on the molecules involved.

A variety of other self-assembled monolayers can be formed, although there is always debate about the degree to which systems self-assemble. Alkyl thiols are known to assemble on many metals, including silver, copper, palladium, and platinum. Alkyl silane molecules (e.g. octadecyltrichlorosilane) are also known to self-assemble on various metal and metal oxide surfaces and are potentially of greater technical relevance than alkyl thiol assembly on metals. Alkyl carboxylates are known to assemble on a variety of surfaces, such as aluminium and mica. In general, see "self-assembled monolayer" from Wikipedia, the on-line encyclopedia, available at http://en.wikipedia.org. See, also, "Self-Assembled Monolayers" published by the Applied Physics Department of Linkopings University, Linkoping, Sweden, available on the web at http://www.ifm.liu.se/applyphys/ftir/sams.html.

In a particularly interesting embodiment of this invention, the self-assembled monolayer coating is formed from an organosilicon compounds containing a halosilane moiety or a disilizane moiety as described, for example, in U.S. 2007/0098894 A1, the disclosure of which is incorporated herein by reference. As disclosed there, organosilanes such as the alkyldisilazanes, aryldisilazanes and alkylaryldisilazanes of the following Formula 1 and the alclylhalosilanes, arythalosilanes and alkylarylhalosilanes of the following Formula 2 bind to a wide variety of different substrates having reactive surface sites such as —OH, nitrogen, hydrogen and halide. Particular examples of such substrates include glass, quartz, various metal oxides such as titanium dioxide and aluminum oxide, and various metals which inherently contain pendant —OH surface groups such as, stainless steel, titanium, titanium alloys, nickel, nickel alloys, and the like.

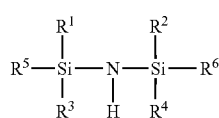
(1)

In Formula (1), $R^1$ through $R^6$ are each individually $C_1$ to $C_6$ alkyl or $C_6$ to $C_{10}$ aryl. Formula (1) includes alkyldisilazanes where $R^1$ through $R^6$ are alkyl, aryldisilazanes where $R^1$ through $R^6$ are aryl, and alkylaryldisilazanes where at least one of $R^1$ through $R^6$ is an alkyl and at least one of $R^1$ through $R^6$ is an aryl.

$$R^7_p R^8_q R^9_r SiX_{4-p-q-r}$$
(2)

In Formula (2), $R^7$ through $R^9$ are each individually $C_1$ to $C_{20}$ alkyl and $C_6$ to $C_{10}$ aryl; where p, q, and r are each 0, 1, 2, or 3 with the proviso that $1 \leq p+q+r \leq 3$; and where each X is a halogen atom. Formula (2) includes alkylhalosilanes where $R^7$ through $R^9$ are alkyl, arylhalosilanes where $R^7$ through $R^9$ are aryl, and alkylarylhalosilanes where at least one of $R^7$ through $R^9$ is an alkyl and at least one of $R^7$ through $R^9$ is an aryl. Specific examples include dichlorodimethylsilane (DDMS) and octadecyltrichlorosilane. See, US 20070020392, the disclosure of which is also incorporated herein by reference.

Also interesting are the fluorinated functionalized macromolecules useful as anti-stiction coatings on MEMS such as described, for example, the above-noted US 20070020392 as well as U.S. Pat. No. 6,930,367, the disclosure of which is also incorporated by reference.

In this connection, it will be appreciated that self-assembled monolayers have been used as anti-stiction coatings in various different MEMS devices (microelectromechanical systems) including flow control devices. The function of an anti-stiction coating in such devices, i.e., to prevent or retard two mating surfaces from sticking together from static friction, is the direct opposite of the function of the self-assembled monolayers used in the inventive flow control devices, i.e., to enhance the seal formed by mating surfaces. This is difference in function is due to the extremely small size of MEMS devices, where frictional forces exert a relatively greater effect than in articles of a conventional size. Because the inventive flow control devices are not MEMS devices, such frictional forces are largely insignificant. Thus, the effect of the self-assembled monolayer coatings in the inventive flow control devices is to improve, not diminish, the seal formed by the mating surfaces.

In any event, the fluorinated functionalized macromolecules which are described in the above-noted US 20070020392 and U.S. Pat. No. 6,930,367, and which can be used in this invention, include at least one fluorinated alkyl, aryl or alkylaryl moiety and at least one functional group such as a silane, halo silane, silizane, carboxyl, thiol, for bonding to the substrate. Compounds in which the fluorinated moiety contains multiple fluorine atoms, especially those that are perfluorinated, are especially interesting. Specific examples include perfluoroctyltrichlorsilane ("PFOTCS"), perfluorodecanoic acid ("PFDA"), perfluorodecyl-trichlorosilane ("FDTS"), perfluoro polyether ("PFPE") and/or fluoroalkylsilane ("FOTS"). See, the above-noted U.S. Pat. No. 6,930,367 as well as US 20070115531, the disclosure of which is also incorporated herein by reference.

In another interesting embodiment, the self-assembled monolayer coating is formed from fluorinated polymeric surfactant, as disclosed, for example, in U.S. 2006/0234901, the disclosure of which is also incorporated herein by reference, either alone or combined with a water-soluble and/or dispersable polymer in the form of an associative complex, as further described in that document. Such polymeric fluorinated surfactants ("fluorosurfactants") may be neutral, anionic, cationic, zwitterionic and/or ionizable partially fluorinated polymeric surfactants, and/or mixtures thereof, and are desirably capable of forming an associative complex with a water soluble and/or dispersible polymer, as described there. Partially fluorinated polymeric surfactants generally include those materials that are not fully perfluorinated, i.e. that contain non-fluorinated carbon centers and/or non-fluorinated alkyl groups. Generally, polymeric surfactants having partially fluorinated alkyl substituents of from 1 to 20 carbon atoms are suitable for making such associative complexes. Also suitable are those partially fluorinated materials having perfluorinated alkyl substituents from 1 to 7 and also from 1 to 4 carbon atoms.

Examples of such polymeric fluorosurfactants include, but are not limited to, the materials corresponding to the general structures I-IV below:

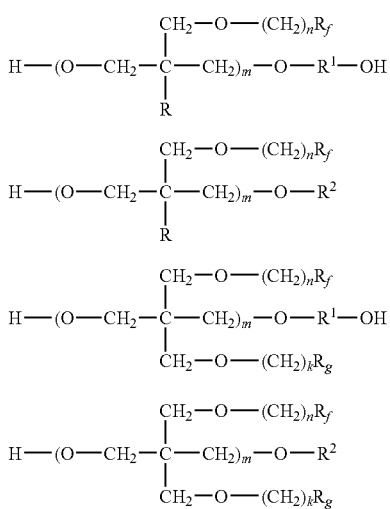

(I, II, III, IV structures)

wherein and m>1 to about 100, n=1 to about 50, k=1 to about 50 including n=k, wherein $R_f$ and $R_g$ are independently selected from perfluorinated alkyl radical, perfluorinated aryl radical, partially fluorinated alkyl radical, partially fluorinated aryl radical, derivatives thereof, and/or combinations thereof, and R is hydrogen, or an alkyl comprising from 1 to 6 carbon atoms, $R^1$ is an alkyl having from 1 to 18 carbon atoms, $R^2$ is an alkyl having from 1 to 40 carbon atoms, wherein R, $R^1$ and/or $R^2$ may independently be alkyl and/or alkylene moieties derivatized with radicals selected from carboxylic, ester, amine, amide, aminoamide, siloxane, silyl, alkylsiloxane, perfluoroallcyl and/or combinations thereof. Also suitable are derivatives of any one of the polymeric fluorosurfactants represented by formula I-IV above, in which derivation at any one or more alkyl positions is independently performed by covalent attachment of polar anionic groups, including for example, but not limited to carboxylate, alkyl esters, sulfate, sulfonate, phosphate, nitrate, and the like; covalent attachment of cationic groups, including for example, but not limited to ammonium, quaternary ammonium, quaternary alkyl ammonium, and the like; covalent attachment of polar nonionic groups, including for example, but not limited to poly(allcylene oxide), such as poly(ethylene oxide) and/or poly(propylene oxide), polyether copolymers, carbonyl, nitrile, thiol, and/or cyano groups, and combinations thereof.

Suitable examples of the polymeric fluorosurfactants useful in the present invention include those derived from polymerizing appropriate fluorinated oxetane monomers to obtain fluorosurfactants corresponding to any one of structures I-IV wherein $R_f$ and $R_g$ are selected from —$CF_3$, —$CF_2CF_3$, —$(CF_2)_pCF_3$, —$R'CF_3$, —$R'(CF_3)_p$, $R''(CF_3)_q$; wherein R' is a $C_1$ to $C_{20}$ linear or branched, alkyl or alkylene moiety, optionally substituted with and/or terminated with at least one —$CF_3$ group, R" is radical comprising a benzyl, phenyl and/or aryl group with q degrees of —$CF_3$ substitution, wherein p is 1 to about 10, and q is between 1 and 5. An example of commercially available polymeric fluorosurfactants include those corresponding to structures I-IV in which $R_f$ and $R_g$ correspond to —$(CF_2)_pCF_3$ with p=3, equivalent to —$CF_3$—$CF_2$—$CF_2$—$CF_3$(—$C_4F_9$), which is recognized as having less environmental bioaccumulation concerns than longer chain perfluoro groups. Other polymeric fluorosurfactants and derivatives suitable for use in the present invention described in U.S. Pat. No. 6,403,760 to Weinert, et al., U.S. Pat. Pub. No. 2003/0060571 to Weinert, et al., U.S. Pat. Pub. No. 2003/0149186 to Medsker et al., U.S. Pat. No. 6,660,828 to Thomas, et al., and U.S. Pat. No. 6,403,760 to Weinert et al., which are all hereby incorporated by reference.

Other suitable examples of the polymeric fluorosurfactants useful in the present invention include those derived from structures I through IV by covalent attachment of polar anionic groups such as carboxylate, sulfate, sulfonate, phosphate, and nitrate. Useful counterions for these groups include $Li^+$, $Na^+$, $K^+$, $Cs^+$, and ammonium or alkyl ammonium groups. Also suitable are polymer derivatized polymeric fluorosurfactants described in U.S. Pat. Pub. No. 2003/0166785 to Medsker et al., and U.S. Pat. No. 6,383,651 to Weinert, et al., both of which are also incorporated herein by reference. Also suitable are copolymers with perfluorinated oxetane compounds formed via radical polymerization and/or cationic polymerizations such as those described in U.S. Pat. No. 6,495,636 to Sugiyama, et al., which is hereby incorporated by reference.

In addition, structure V is an example of a useful anionic polymeric fluorosurfactant that may be employed in the present invention.

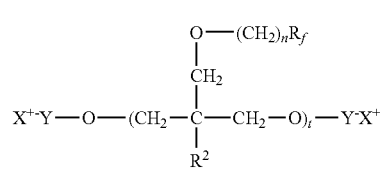

V wherein t typically ranges from 6 to about 8, but may be any value from 1 to about 100, n=1 to about 50, $R_f$ is selected from —$CF_3$, —$CF_2CF_3$, —$(CF_2)_pCF_3$, —$R'CF_3$, —$R'(CF_3)_p$, —$R''(CF_3)_q$, wherein R' is a $C_1$ to $C_{20}$ linear or branched, alkyl or alkylene moiety, optionally substituted with and/or terminated with at least one —$CF_3$ group, R" is radical comprising a benzyl, phenyl and/or aryl group with q degrees of —$CF_3$ substitution, wherein p is 1 to about 10, and q is between 1 and 5, $R_2$ is an alkyl having from 1 to 40 carbon atoms, further including alkyl and/or alkylene moieties derivatized with radicals selected from carboxylic, ester, amine, amide, aminoamide, siloxane, silyl, alkylsiloxane, perfluoroalkyl and/or combinations thereof, $X^+$ is any suitable cationic counterion as described herein, and wherein $Y^-$ is an anionic moiety selected from carbonate, borate, sulfate, sulfonate, phosphate, phosphonate, nitrate and/or combinations thereof. An example of a commercially available material corresponding to structure V is one wherein n=2, $R_f$=—$CF_3$, $R^2$=—$CH_3$ and Y=$SO_3^-$, thus being a sulfate moiety and $X^+$ is $Na^+$ or $NH_4^+$.

Other suitable examples of polymeric fluorosurfactants useful in the present invention include those containing covalently bonded cationic groups such as ammonium or quaternary ammonium or phosphonium. The anionic counterions associated with these groups can include fluoride, chloride, bromide, iodide, and tetrafluoroborate ($BF_4^-$).

Other polymeric fluorosurfactants useful in the present invention include those containing covalently bonded polar nonionic groups. These nonionic groups may be selected from various polyethers having from 1 to about 100 repeat units (n), and include, but are not limited to groups such as —O—($CH_2CH_2O)_n$H (poly(ethylene oxide)), —O—$CH_2$ (CH₃)CH₂O)ₙH (poly(propylene oxide)), polyether copolymers, carbonyl, nitrile, thiol, and/or cyano groups, and combinations thereof.

Still other polymeric fluorosurfactants useful in the present invention include those containing covalently bonded polar zwitterionic groups, forming an amphoteric type polymeric fluorosurfactant.

In the polymeric fluorosurfactants of the present invention, the polar group or groups may be covalently bonded to the ends of the polymeric fluorosurfactant. Also suitable, however, are polymeric fluorosurfactants in which the polar groups, or additional non-terminally bonded polar groups, are also covalently bonded at other positions on the polymeric fluorosurfactant molecule. Any variety of synthetic schemes may be used to attach the polar groups to polymeric fluorosurfactants suitable for use, including addition through polymerization with initiators or chain transfer agents, grafting reactions, addition reactions such as condensation of a hydroxyl group with an isocyanate that contains a polar group to be added, substitution or metathesis, or esterification of a hydroxyl group with sulfuric acid. Such reactions are well known in the art, and example applications to the synthesis of useful polymeric fluorosurfactants can be found in U.S. Pat. No. 2003/0109662 to Medsker, et al., and U.S. Pat. No. 6,660,828 to Thomas, both reference above.

Anchor Layer

In accordance with another aspect of this invention, the component of the inventive flow control device carrying the self-absorbing monolayer can be further provided with a suitable anchor, primer or bonding layer to increase the bonding strength of the monolayer.

In this connection, it is already known that the adhesive strength of coatings made from a variety of different functionalized compounds to various different substrates can be significantly enhanced by providing the substrate with a suitable anchor, bonding or primer layer. See, for example, US 2005/0271809, the disclosure of which is also incorporated herein by reference. As described there, the bonding strength of self-assembled monolayer coatings to substrates formed from a wide variety of different materials can be significantly increased by providing the substrate with an oxide primer layer, especially those formed from silicon oxide, aluminum oxide and titanium oxide. This technology can be used in the present invention to increase the bonding strength of the self assembled monolayer of this invention to their substrates, especially those made from various metals such as stainless steel and the like. In a similar way, a thin coating of any other material known to bond well the particular SAM to be formed can be applied to the component to be coated. So, for example, metal components can be provided with a thin coating of gold, silver, copper, palladium, platinum or silicon dioxide, for example, for increasing the bond strength of SAM's formed from alkyl silanes, since such SAM's are known to bond well to such materials.

Other Applications

Although the above description focuses primarily on valves and fittings, the present invention is applicable to establishing sealing engagements, both temporary and permanent, in all other types of fluid-handling devices. For example, many different types of fluid handling devices, such as pumps, meters, valves, couplings, etc., generally referred to as "fittings," have cooperating parts defining mating sealing surfaces which are permanently bonded to one another for forming a permanent seal. Other cooperating parts define mating sealing surfaces which move together and apart for creating and then releasing a temporary seal. Such cooperating metal parts may be made from metals such as stainless steel, titanium, titanium alloys, nickel, nickel alloys, and the like or plastics, or combinations thereof. In accordance with this invention, the temporary or permanent seal created in each of these devices can be improved by forming at least one of these mating sealing surfaces from a self assembled monolayer which is softer (i.e., more deformable) than the base materials from which the cooperating parts defining these mating sealing surfaces are made.

For example, this invention can be used to advantage where joining fittings to conduits is accomplished mechanically (i.e., where gripping and sealing of the fitting to the conduit is accomplished without bonding as by welding or adhesive) such as in conduit systems using flare fittings and conduit systems using ferrule-based fittings, as more fully discussed below. In this context, a "ferrule-based fitting" is a fitting in which the primary mechanism by which the fitting grips and seals the conduit is done mechanically by a ferrule.

Ferrule-based fittings are well known articles of commerce. Typically, they are composed of a fitting body adapted to fit over the end of the conduit, a fitting nut and a complementary ferrule. Fittings intended for use with metal conduit are almost always made from metal, although other materials are possible. Some ferrule-based fittings use two ferrules, while three or more ferrules are theoretically possible. The fitting body, fitting nut and ferrule(s) are designed such that final tightening of the nut on the fitting body (known as "pull-up") causes the ferrule, the portion of the conduit engaging the ferrule, or both, to plastically deform to a greater or lesser degree.

Four general types of ferrule-based fittings are normally used. The most common can be regarded as a compression-type ferrule. Common, every-day ferrule-based fittings purchased in the corner hardware store are a good example of this. Fittings formed from such ferrules show only minor, localized conduit deformation, with the gripping force created by the ferrule being due primarily to friction.

The second type of ferrule-based fitting can be regarded as a swaging-type fitting. In these fittings, the gripping force created by the ferrule is due primarily to swaging, i.e., significant radial deformation but not cutting, of the conduit surfaces.

The third type of ferrule-based fitting can be regarded as a bite- or cutting-type fitting. In these fittings, the gripping force created by the ferrule is due in significant part to the leading edge of the ferrule cutting into the surface of the conduit. Some swaging of conduit may also occur. Ferrule-based fittings of this type are shown, for example, in U.S. Pat. No. 2,179,127, the disclosure of which is incorporated herein by reference.

The fourth type of ferrule-based fitting can be regarded as colleting deformation grip-type fitting. In these fittings, the gripping force created by the ferrule is due to a combination of forces. As in cutting-type fittings, significant gripping force is created as a result of the leading edge of the ferrule cutting into the surface of the conduit. In addition, substantial additional gripping action is generated outboard of this cut through deformation of the ferrule during pull-up. Ferrule-based fittings of this type are shown, for example, in U.S. Pat. No. 6,629,708 B2, the disclosure of which is also incorporated herein by reference, especially in FIGS. 2-28.

This invention can be advantageously used in connection with each of these joining applications, where cooperating parts define mating sealing surfaces to be permanently bonded together, since the self assembled monolayer formed on one or both mating sealing surfaces forms a more effective seal, for the reasons indicated above.

Monolayers of Functionalized Macromolecules—Non-Self-Assembled

In accordance with still another aspect of this invention, at least one of the mating sealing surfaces of the inventive flow control device is formed from a monolayer of functionalized macromolecules which are not self-assembled. As in the other embodiments of this invention, the functionalized ends of these macromolecules effectively bond to the substrate on which they are coated, while the other (distal) ends of these macromolecules project away from this substrate. Even though these distal ends may not self-assemble, they nonetheless still provide a softer surface and hence a better seal, than would otherwise be the case if no coating were employed.

Although only a few embodiments of the present invention have been described above, it should be appreciated that many modifications can be made without departing from the spirit and scope of the invention. All such modifications are intended to be included within the scope of the present invention, which is to be limited only by the following claims.

The invention claimed is:

1. A fitting for a conduit, the fitting having at least two cooperating metal parts structured to sealingly engage one another, these cooperating metal parts defining respective mating sealing surfaces which foam a permanent seal when the fitting is in a fully pulled-up condition, at least one of these cooperating metal parts having a conduit engaging surface structured to foam a permanent seal with the conduit when the fitting is in a fully pulled-up condition, wherein at least one of
    (a) a mating sealing surface of one of the cooperating metal parts, and
    (b) the conduit engaging surface of the at least one cooperating metal part, carries a coating of a self assembled monolayer of functionalized macromolecules.

2. The fitting of claim 1, wherein a mating sealing surface of one of the cooperating metal parts carries the coating of a self assembled monolayer of functionalized macromolecules.

3. The fitting of claim 2, wherein the fitting includes a pair of metal coupling components adapted to be disposed in end-to-end relationship with respect to one another and a generally annular sealing gasket arranged between the pair of coupling components, each of the metal coupling components defining a sealing surface structured to form a permanent seal with the generally annular sealing gasket when the fitting is in a fully pulled-up condition.

4. The fitting of claim 3, wherein the sealing surface of each metal coupling component carries a coating of a self assembled monolayer of functionalized macromolecules.

5. The fitting of claim 2, wherein the fitting is a ferrule-type fitting including a ferrule defining a tapered annular external surface and a coupling body defining a tapered camming mouth structured to form a permanent seal with the tapered annular external surface of the ferrule when the fitting is in a fully pulled-up condition, wherein either the tapered annular external surface of the ferrule or the tapered camming mouth of the coupling body carries a coating of a self assembled monolayer of functionalized macromolecules.

6. The fitting of claim 1, wherein the conduit engaging surface of the at least one cooperating metal part carries the coating of a self assembled monolayer of functionalized macromolecules.

7. The fitting of claim 6, wherein the fitting comprises a conduit gripping device defining a front end or edge and a drive member structured to cause the front end or edge of the conduit gripping device to indent or embed in the outer surface of the conduit thereby forming a permanent seal when the fitting is in a fully pulled-up condition, wherein the front end or edge of the conduit gripping device carries the coating of a self assembled monolayer of functionalized macromolecules.

8. The fitting of claim 7, wherein the conduit gripping device is a Bellville washer.

9. The fitting of claim 6, wherein the fitting is structured to form a permanent seal with a conduit having flared end, the including a fitting body having a tapered forward end structured to form a permanent seal with the inside surface of the tapered end of the conduit, wherein the tapered forward end of the fitting body carries the coating of a self assembled monolayer of functionalized macromolecules.

10. The fitting of claim 1, wherein the self-assembled monolayer is formed from a functionalized macromolecule having at least one functional group selected from silane, halosilane, silizane, siloxy, carboxyl, thio, amino and amido.

11. The fitting of claim 10, wherein the self-assembled monolayer is formed from a functionalized macromolecule having a halosilane moiety or a disilizane moiety.

12. The fitting of claim 11, wherein the self-assembled monolayer is formed from a functionalized macromolecule having the following formula

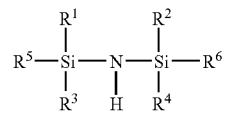

(1)

where, $R^1$ through $R^6$ are each individually $C_1$ to $C_6$ alkyl or $C_6$ to $C_{10}$ aryl.

13. The fitting of claim 11, wherein the self-assembled monolayer is formed from a functionalized macromolecule having the following formula

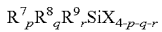

(2)

where $R^7$ through $R^9$ are each individually $C_1$ to $C_{20}$ alkyl and $C_6$ to $C_{10}$ aryl; where p, q, and r are each 0, 1, 2, or 3 with the proviso that $1 \leq p+q+r \leq 3$; and where each X is a halogen atom.

14. The fitting of claim 10, wherein the self-assembled monolayer is formed from a fluorinated functionalized macromolecules include at least one fluorinated alkyl, aryl or alkylaryl moiety and at least one functional group such as a silane, halo silane, silizane, carboxyl, thiol, for bonding to the substrate.

15. The fitting of claim 1, wherein the self-assembled monolayer is formed from at least one of a neutral, anionic, cationic, zwitterionic and ionizable partially fluorinated polymeric surfactant.

* * * * *

UNITED STATES PATENT AND TRADEMARK OFFICE
CERTIFICATE OF CORRECTION

PATENT NO. : 8,434,793 B2
APPLICATION NO. : 12/669106
DATED : May 7, 2013
INVENTOR(S) : William H. Glime It is certified that error appears in the above-identified patent and that said Letters Patent is hereby corrected as shown below:

In the Claims:

Col. 25, Claim 1, line 25, "foam" should read --form--.

Col. 25, Claim 1, line 28, "foam" should read --form--.

Signed and Sealed this
Third Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,434,793 B2
APPLICATION NO. : 12/669106
DATED : May 7, 2013
INVENTOR(S) : Glime Page 1 of 1

It is certified that error appears in the above-identified patent and that said Letters Patent is hereby corrected as shown below:

In the Specification

Col. 21, line 46, "poly(allcylene oxide)" should read ---poly(alkylene oxide)---.

Signed and Sealed this
Twenty-ninth Day of October, 2013

Teresa Stanek Rea
*Deputy Director of the United States Patent and Trademark Office*